(12) United States Patent
Guy

(10) Patent No.: US 6,561,139 B2
(45) Date of Patent: May 13, 2003

(54) METHOD AND APPARATUS FOR REDUCING EMISSIONS OF INTERNAL COMBUSTION ENGINES

(75) Inventor: Evan S. Guy, Helotes, TX (US)

(73) Assignee: Evan Guy Enterprises, Inc., Helotes, TX (US)

(*) Notice: Subject to any disclaimer, the term of this patent is extended or adjusted under 35 U.S.C. 154(b) by 0 days.

(21) Appl. No.: 09/970,900

(22) Filed: Oct. 4, 2001

(65) Prior Publication Data

US 2003/0066498 A1 Apr. 10, 2003

(51) Int. Cl.⁷ ................................................ F02B 41/00
(52) U.S. Cl. .......................................................... 123/26
(58) Field of Search ........................ 123/26, 265, 658, 123/585, 193.6, 268, 269, 281–293

(56) References Cited

U.S. PATENT DOCUMENTS

| | | |
|---|---|---|
| 1,477,363 A | 12/1923 | Kessler |
| 1,537,616 A | 5/1925 | Mellen |
| 2,073,620 A | 3/1937 | Bicknell |
| 2,246,446 A | 6/1941 | Kylen |
| 2,662,513 A * | 12/1953 | Bodine, Jr. ................. 123/281 |
| 3,613,646 A | 10/1971 | Hisada |
| 3,906,908 A | 9/1975 | Franke |
| 3,964,263 A | 6/1976 | Tibbs |
| 4,246,882 A | 1/1981 | Kikuta et al. |
| 4,289,097 A | 9/1981 | Ward |
| 4,367,700 A | 1/1983 | Pace |
| 4,545,346 A | 10/1985 | Grow |
| 4,736,715 A | 4/1988 | Larsen |
| 4,993,372 A * | 2/1991 | Mott et al. .............. 123/65 BA |
| 5,452,702 A | 9/1995 | Ebihara et al. |
| 5,657,724 A | 8/1997 | Brown et al. |
| 5,664,541 A * | 9/1997 | Yoo ........................... 123/275 |
| 5,701,864 A * | 12/1997 | Tanigawa et al. ........... 123/290 |
| 5,730,110 A | 3/1998 | Nelson et al. |
| 5,738,051 A | 4/1998 | Binversie et al. |
| 5,771,857 A | 6/1998 | Willi |
| 5,937,800 A | 8/1999 | Brown et al. |
| 5,975,050 A | 11/1999 | Brown et al. |
| 6,000,384 A | 12/1999 | Brown et al. |
| 6,032,617 A | 3/2000 | Willi et al. |
| 6,055,963 A | 5/2000 | Brown et al. |
| 6,095,112 A * | 8/2000 | Glauber et al. ............. 123/275 |
| 6,167,699 B1 | 1/2001 | Johnston et al. |

* cited by examiner

Primary Examiner—Henry C. Yuen
Assistant Examiner—Hyder Ali
(74) Attorney, Agent, or Firm—Boyle Fredrickson Newholm Stein & Gratz S.C.

(57) ABSTRACT

Secondary air is strategically introduced into a combustion chamber of an internal combustion engine event after the main combustion event to reduce HC and CO emissions. While the technique is applicable to virtually any otto cycle engine, it is particularly well-suited for use in a "rich burn" utility engine typically operating at an equivalence ratio (ER) of about 1.2 or above. Such engines start easily, run well, and emit low levels of NOx at ERs on the order of 1.2. The invention takes advantage of these benefits by admitting an air/fuel charge and allowing otto-cycle combustion to occur in at least generally the usual fashion (although at least preferably as rapidly as possible for a given engine design), using the standard fuel-rich carburetor calibration to fuel the engine. Then, a subsequent reaction process is initiated by supplying supplemental air to the engine in quantities and at times that assure reaction of the still-hot residual HC and CO products with oxygen in the supplemental air. The secondary reaction dramatically reduces HC and CO emissions while retaining NOx emissions at or near the low levels enjoyed by rich burn utility engines.

29 Claims, 13 Drawing Sheets

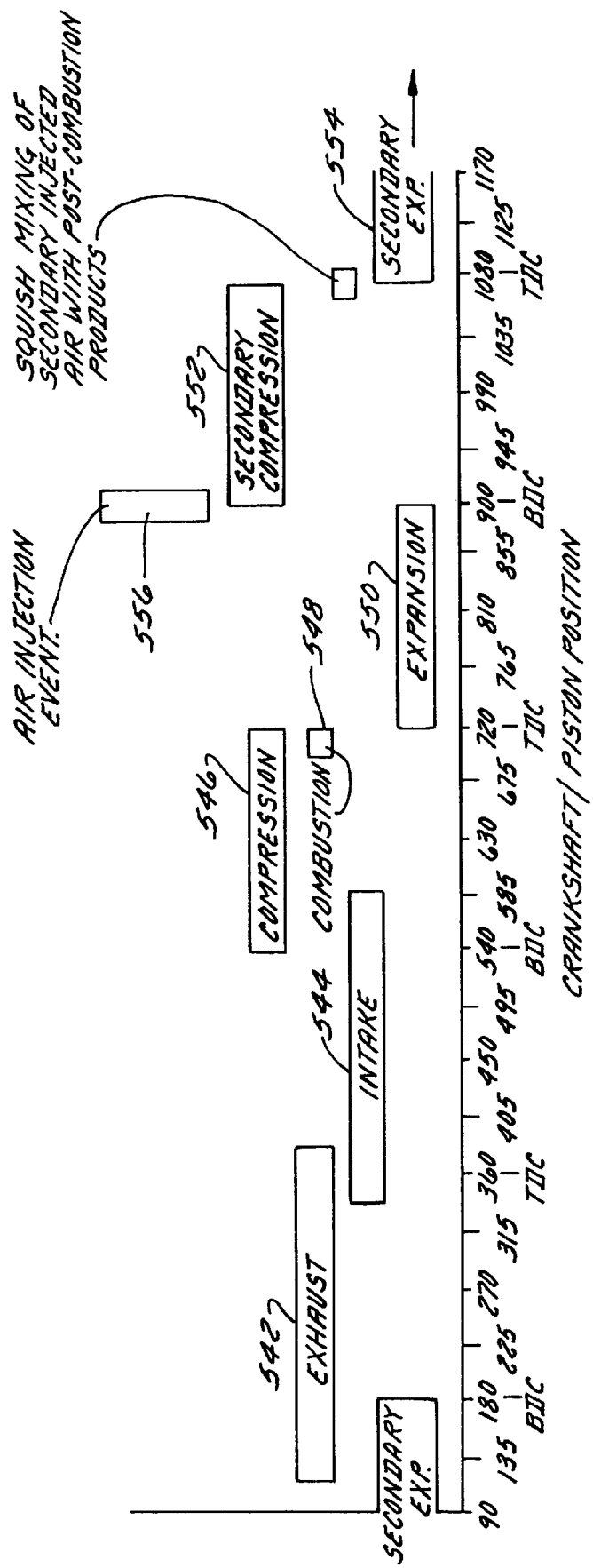

METHOD AND APPARATUS FOR REDUCING EMISSIONS OF INTERNAL COMBUSTION ENGINES

BACKGROUND OF THE INVENTION

1. Field of the Invention

The invention relates to internal combustion engines and, more particularly, relates to a method and apparatus for reducing hydrocarbon and carbon monoxide emissions from an engine by effecting a secondary reaction between residual reactable combustion product components and supplemental air following a primary combustion event.

2. Discussion of the Related Art

Much effort has been expended in recent years to lower engine emissions to reduce urban smog. Urban smog, a severe global environmental problem, is formed by the sunlight-induced photochemical reaction of hydrocarbons (HC) with oxides of nitrogen (NOx). Because HC and NOx are both emitted by internal combustion engines, smog reduction efforts have focused on reducing these emissions. Carbon monoxide (CO), another undesired byproduct of combustion, is also an emission of concern to many researchers and engine designers. A discussion of available techniques for reducing these emissions and the problems with those techniques requires an understanding of how they are formed.

Referring to FIG. 1, the relationship between exhaust product concentrations versus equivalence ratio (ER) is graphically illustrated for a spark-ignited combustion of a homogeneous mixture of fuel and air. ER is the ratio of the stoichiometric air-fuel ratio of the air/fuel charge, divided by the actual air/fuel ratio of the charge. For example, a fuel-lean mixture having an air-fuel ratio of 29.4 and a stoichiometric air-fuel ratio 14.7 has an equivalence ratio of 0.5. A stoichiometric air-fuel ratio has an equivalence ratio of 1.0; a fuel-lean mixture has an ER value of less than 1, and a fuel-rich mixture has an ER value of greater than 1.

Curve 30 plots NOx vs. ER. NOx are formed when available oxygen and nitrogen react with one another at elevated temperatures. Generally speaking, NOx concentrations increase as the ER rises above about 0.6. However, the curve 30 also illustrates that, as the ER continues to increase beyond 1.0, the NOx concentrations fall sharply, even though the combustion temperature does not drop as sharply. This effect is due principally to the consumption of available oxygen through the reaction of the fuel and air as represented by the downwardly sloping curve 32. That is, at ERs significantly above 1.0, more fuel is available in the combustion chamber for reaction with a given volume of atmospheric oxygen. Because hydrocarbons react with oxygen more readily than nitrogen reacts with oxygen, a greater percentage of the available oxygen is consumed through combustion, leaving relatively little remaining oxygen in the combustion chamber to react with nitrogen. As a result, NOx emissions are sharply reduced as ERs rise above a stoichiometric air/fuel ratio.

Curves 34, 36, and 38 also show that CO, $H_2$, and HC, increase steadily and non-linearly with ER due to the fact that insufficient air is present in the combustion chamber at high ERs to assure complete reaction of fuel with air during the combustion event. As a result, after combustion ceases at high ERs, the resultant combustion products have a relative high percentages of unburnt and partially burnt fuel products. Because these products are capable of oxidation under the appropriate conditions, they will hereafter be referred to as "residual reactable combustion product components." Residual reactable combustion product components form a large percentage of the undesired HC and CO emissions.

Hence, it can be seen that HC and CO emissions are proportionaly related at ERs above the stoichiometric air fuel ratio. Traditional emission reduction techniques attempted to employ fuel injection and air supply techniques to control the ER to be relatively close to 1.0 and to employ engine after-treatment in the form of a three-way converter to further reduce HC, CO, and NOx emissions. When operated very close to the stoichiometric air-fuel ratio (ER= 1), the three-way catalyst has the unique ability to reduce and oxidize HC, CO, and NOx with impressive efficiency, hence reducing HC, CO, and NOx emissions to a level that the engine can reasonably be considered to be "clean" or "non-polluting." The typical clean engine emits pollutant concentrations that are measured in the range of parts-per-million. Most modern automotive engines and derivatives of them can be considered to be non-polluting by this standard.

In contrast, many non-automotive engines, particularly relatively small utility engines and derivatives of them, are usually considered "dirty" or "polluting" because they do not incorporate active measures to reduce HC, CO and NOx emissions to the levels enjoyed by clean engines. Typical uses for these engines include, but are not limited to: lawn mowers; line trimmers, chain saws, generator sets, welding machines; cement mixers, chipper/shredder machines, minibikes, motorcycles, jet skis, outboard engines, and low-cost automotive engines for emerging nations. These engines are "rich-burn" engines, typically operating at an ER value of about 1.2 or even higher. Hence, 20% of the fuel admitted to the engine passes through the engine without being combusted. The engines are factory-calibrated to run rich because they perform well at this condition and also run cooler with reduced propensity for destructive combustion knock. This, in turn, reduces a manufacturer's warranty exposure. These engines typically produce low NOx emission levels because they operate at such a high ER.

HC and CO emissions of levels produced by utility engines and other rich-bum engines are not readily oxidized using a catalytic converter. That is, catalysts typically employed by non-polluting engines would be overwhelmed by the quantity of residual reactable combustion components emitted by a typical rich-bum utility engine. That engine is passing 20% excess fuel to the catalyst, not the trace amounts characteristic of a modern automotive engine. The reaction of 20 percent of the engine's fuel flow within a catalytic converter generates a sizeable exothermic reaction, raising the exhaust gas temperature sharply. This high temperature can destroy the typical catalytic converter in short order.

An attempt to "lean out" the polluting utility engine to near stoichiometric air-fuel ratio in order to reduce HC and CO emissions would also be fraught with difficulty. As briefly discussed above, this type of engine experiences compromised performance when operated at the stoichiometric air-fuel ratio. Power density, final engine weight, and cost also suffer when traditional clean technologies are employed. Design improvements to offset some of these problems would require increased compression ratio, high quality valve, valve seat, and valve guide materials, improved heat rejection schemes (likely liquid-cooling), and/or electronic ignition systems that incorporate combustion knock sensing. All of these design changes are relatively expensive to design and to implement. They also undesirably add to the weight and/or cost of the engine and the machine powered buy it. Weed trimmers, for instance, are too light-weight and inexpensive to be economically powered by a large, heavy, expensive engine.

Finally, even if a "dirty" engine were reconfigured to run well at an ER that is sufficiently near an ER of 1 to reduce HC and CO emissions sufficiently for practical implementation of an oxidation catalyst, the resulting engine would produce high NOx levels that would also have to be dealt with by a three way catalyst or otherwise.

While the combustion characteristics of stratified charge engines differ from that of a homogenous charge spark-ignited engine, the underlying fundamental principals are quite similar, as are the difficulties encountered when attempting to reduce HC, CO, and NOx emissions. Similarly, while reducing HC, CO, and NOx emissions without employing fuel injectors and/or a three way catalyst and/or other extreme or expensive measures is especially difficult yet desirable in a rich-burn, spark-ignited utility engine, it is also sufficiently difficult yet desirable in a variety of other otto cycle engines and derivatives of them.

Hence, the need has arisen to provide a cost-effective, easily implemented technique for reducing HC, CO, and NOx emissions from an internal combustion engine without having to employ fuel injectors, catalysts, or other complex and/or cost prohibitive measures.

SUMMARY OF THE INVENTION

The invention differs sharply from conventional thinking in that it does not consider a lean-burn control strategy to be a prerequisite to effective HC, CO, and NOx emission reductions, nor does it require a three way catalyst or other aggressive ancillary aftertreatment equipment to reduce those emissions. The inventor reasoned that the typical OEM-supplied utility engine, as well as some other engines, start easily, run well, and emit low levels of NOx at ERs on the order of 1.2, so he decided to retain the characteristic fuel-rich engine operation and reduce HC and CO emissions in the simplest manner possible. The solution was post-combustion high-temperature residual oxidation.

More particularly, in the case of homogenous charge spark-ignited utility engine (comprising the most likely application for the invention but certainly not the only possible application), spark-ignited combustion is allowed to occur in at least generally the usual fashion (although at least preferably as rapidly as possible for a given engine design), using the standard fuel-rich carburetor calibration to fuel the engine. Then, a subsequent reaction process is initiated by supplying additional air to the engine in quantities and at times that assure reaction of the still-hot residual HC and CO products with oxygen in the supplemental air, thereby reducing HC and CO emissions.

Still more specifically, and in accordance with a first aspect of the invention, a method of reducing engine emissions comprises admitting fuel and air into a combustion chamber of an engine cylinder and then igniting the fuel to initiate an expansion stroke of the engine and to form combustion products. Then, additional air is admitted into the combustion chamber so as to react with residual reactable components of the combustion products to effect post-combustion oxidation of the residual reactable components. The resultant clean combustion products are then exhausted from the engine.

In accordance with one preferred embodiment of the invention, the engine is a 4 stroke reciprocating engine, and the post-combustion oxidizing step comprises reacting the residual reactable combustion products with air during at least one of the expansion stroke of the engine and the exhaust stroke of the engine, preferably by injecting air into an air curtain through which the combustion products pass. Air could be injected either on an "early cycle" basis, i.e, timed such that the combustion products pass through the air curtain during at least part of the expansion stroke of the engine, or on a "late cycle" basis, i.e., timed such that the combustion products pass through the air curtain during at least part of the exhaust stroke of the engine. Preferably, the post-combustion oxidizing event is timed such that post-combustion oxidization occurs during at least part of the expansion stroke under a first engine operating condition and during the exhaust stroke during at least part of a second engine operating condition. For instance, the first and second engine operating conditions could be first and second load conditions, the second load condition being a relatively heavy load condition when compared to the first load condition.

In another practical embodiment of the invention, the engine could be a 2 stroke reciprocating engine, and the post-combustion oxidization event could take place during an expansion exhaust stroke of the engine.

In another, less practical but conceptually simpler embodiment of the invention, the engine could be a 6 stroke engine, and the post-combustion oxidization event could take place during at least one of a recompression stroke and a re-expansion stroke occurring sequentially after the expansion stroke of the engine and before an exhaust stroke of the engine.

An internal combustion engine configured to effect a post combustion reaction event as described above is also provided.

These and other advantages and features of the invention will become apparent to those skilled in the art from the detailed description and the accompanying drawings. It should be understood, however, that the detailed description and accompanying drawings, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The invention is explained in more detail by means of the following description of its exemplary embodiments illustrated in the drawings in which:

FIG. 21 is a timing chart illustrating intake and ignition events for a 6 stroke engine incorporating a supplemental air supply scheme in accordance with another preferred embodiment of the invention.

DETAILED DESCRIPTION OF THE PREFERRED EMBODIMENTS

Figure 1:
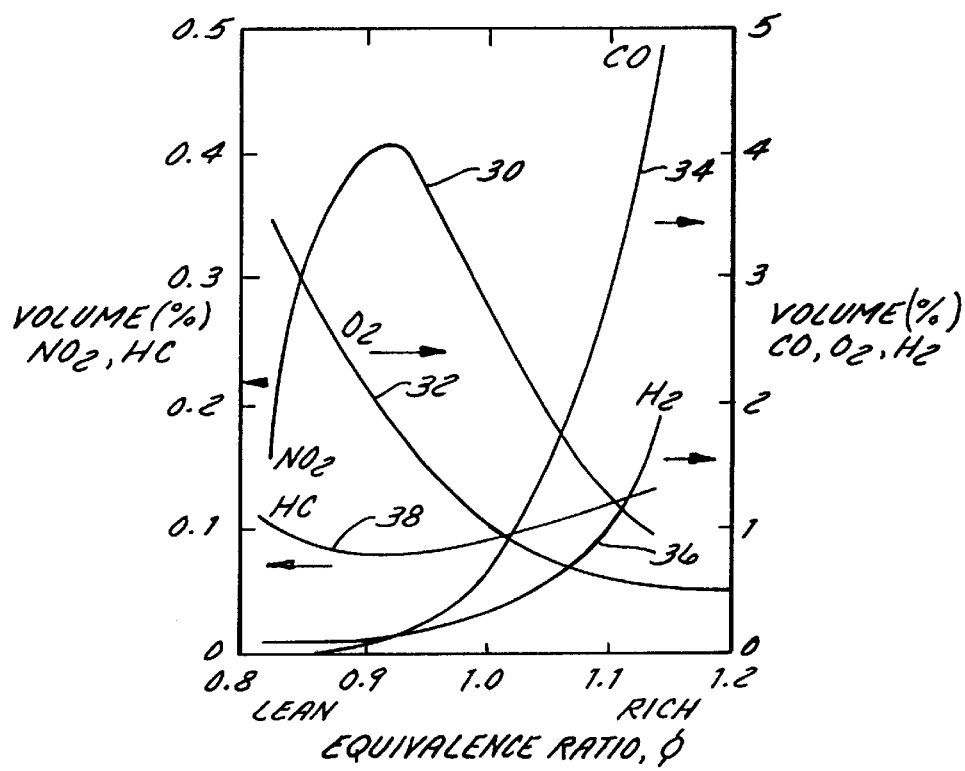
FIG. 1 is a graph illustrating the effects of changes in equivalence ratio (ER) on various engine emissions.

The invention as described briefly above and described and claimed in more detail below is applicable to a wide variety of internal combustion engines including:

4 stroke automotive type spark-ignition engines, 2 stroke and 4 stroke utility engines, and less conventional otto cycle engines such as 6 stroke engines, rotary engines, and wobble plate engines.

Regardless of its type, the engine is configured to strategically introduce additional air into the engine so as to effect a secondary oxidation event after initiation of the main combustion event so as to reduce HC and CO emissions while retaining NOx emissions substantially at or even below the level that they would ordinarily be exhibited by the engine. Several such engines, and control schemes for controlling those engines to achieve the goal of the invention, will now be described, it being understood that the invention is in no way limited to these engines.

1. 4 Stroke Utility Engine

A. Theory of Operation

A key aspect of the invention lies in the strategic introduction of additional air into the engine's combustion chamber at times and under conditions that will lead to a post-combustion reaction event of the oxygen in that air with residual reactable components of combustion products that remain after the primary combustion event. Depending on the engine type, the combustion chamber may be located either within the main cylinder bore or other main chamber containing the reciprocating piston or other movable power producing member, or spaced from but connected to the bore or other main chamber. The reactable components include unburnt and partially reacted fuel components as well as CO and other combustion byproducts that are capable of oxidation under suitable heat and pressure conditions. Depending on the configuration of the engine, the air may be admitted into the combustion chamber via secondary compression and expansion strokes or may be admitted during part of the traditional 2 stroke or 4 stroke cycle of an engine. Supplemental air and primary air could conceivably be supplied via the same pressurized air supply system. In the typical case in which primary air is inducted into the engine via an intake valve, secondary air is preferably supplied via a separate air injection system. Hence, the term "air injection" will hereafter be used to refer to the preferred embodiment, it being understood that air could be supplied by sources other than a dedicated air injection system.

Air injection preferably is carefully timed to assure that the residual reactable combustion product components thoroughly mix with the air under temperature and pressure conditions that will effect or at least approximate a homogenous charge compression ignition (HCCI) combustion event to the extent that the supplemental air reacts with the residual reactable combustion products in the absence of a separate ignition source.

In the case of a 4 stroke utility engine (one of the most likely applications of the invention) a rich air/fuel mixture (typically having an ER of about 1.2) is admitted into the engine's combustion chamber during its intake stroke and ignited in at least generally the normal fashion. Then, during either the ensuing expansion stroke or the subsequent exhaust stroke, air is injected into the engine to mix with and react with the hot exhaust gases flowing into or out of the combustion chamber, thereby oxidizing hydrocarbons in the gases and reducing HC and CO emissions before the remaining combustion products are discharged from the exhaust valve. The process can be facilitated by providing a combustion chamber in the engine that is spaced from the main cylinder bore but that is connected to the cylinder bore by an intake/exhaust opening that permits unrestricted flow between the combustion chamber and the bore, at least when the piston is below its top dead center position. In this case, the additional air is supplied to the combustion chamber so as to mix with the combustion products either in an early cycle fashion (i.e., during the expansion event in which the combustion products are flowing into the cylinder bore from the combustion chamber) or a late cycle fashion (i.e., during the exhaust event in which combustion products are flowing into the combustion chamber from the cylinder bore en route to the exhaust valve). Whether it is injected on an early cycle basis or a late cycle basis, the additional air preferably is supplied at a proper ratio at which the end products of the secondary post combustion reaction event contains neither fuel components, nor oxygen. Insufficient injected air would result in higher than ideal HC and CO emissions, while excessive injected air flow would cause the engine to suffer efficiency losses due to the energy required to compress the air.

Figure 2:
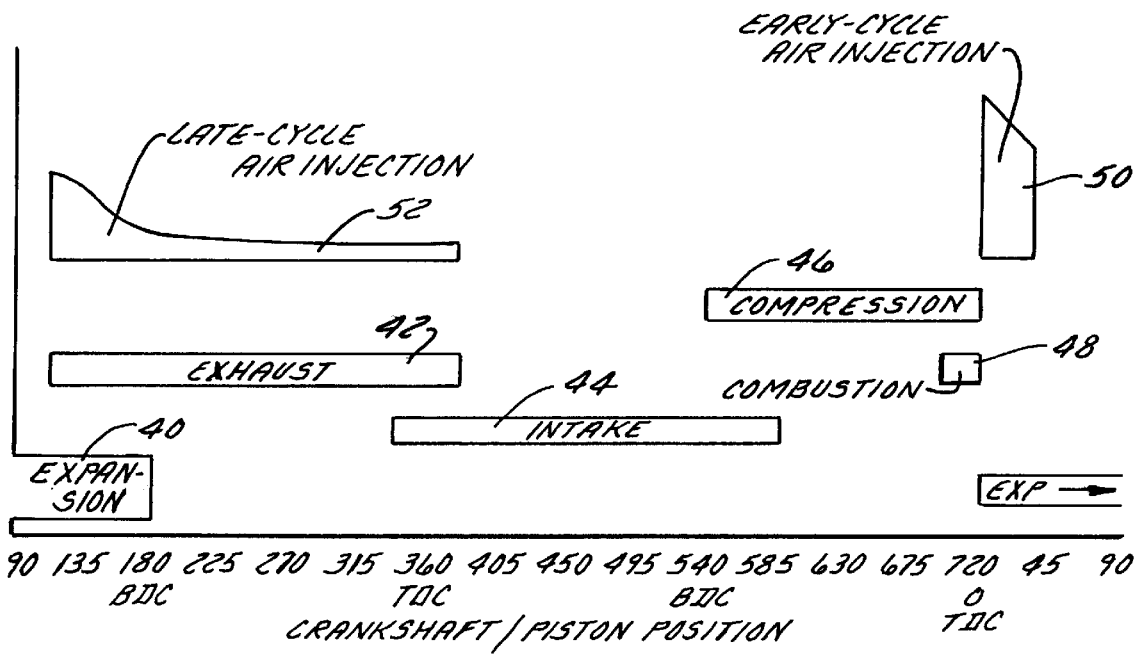
FIG. 2 is a timing chart illustrating intake and ignition events for a 4 cycle engine incorporating a supplemental air injection system constructed in accordance with a preferred embodiment of the invention.

Typical secondary air injection events for both early cycle and late cycle injection are illustrated via the timing diagram of FIG. 2. Typical expansion, exhaust, intake, and compression strokes for a utility 4 cycle engine are illustrated at 40, 42, 44, and 46, with all events being referenced to the traditional top dead center (TDC) position of 0° crank angle (CA). The illustrated overlap of intake and exhaust events and the overlap of intake/compression and expansion/exhaustion events also is typical for engines of this type. However, the illustrated combustion event 48 is slightly atypical for a spark-ignited utility engine to the extent that ignition is retarded by about 10° CA and the duration is shortened from the typical length of 50° to 60° CA to a length of about 20° to 25° CA. This "fast burn" effect is desirable to increase the heat of combustion and to leave adequate time during the subsequent expansion and exhaust strokes to optimally effect the post-combustion reaction event. Fast burn can be achieved, e.g., through suitable design of the combustion chamber and/or through the inclusion of multiple ignition sources within the combustion chamber.

Still referring to FIG. 2, in an early cycle air injection event 50, the secondary air injection event preferably begins at or very soon after the piston reaches its TDC position so that supplemental air begins to enter the combustion chamber when at least nearly all of the hot combustion products are still present in the combustion chamber and even before commencement of the next expansion stroke 40. Because the exhaust products flow into the cylinder bore very rapidly, the air should be supplied at a relatively high flow rate as soon as practical after the primary combustion event to assure the injection of sufficient air into the combustion chamber to oxidize the residual reactable components before the combustion gases flow into the cylinder bore. Rapid air injection is facilitated by the decreasing pressure in the combustion chamber during the expansion stroke. Hence, in the illustrated embodiment, secondary air is supplied from just after TDC and continues for less than 50° CA.

Still referring to FIG. 2, a late cycle air injection event involves the injection of supplemental air into the combustion chamber during a secondary air injection event 52 occurring during the exhaust stroke of the engine. The injection pressure must exceed the cylinder pressure (on the order of 4 bar) to match the air flow rate with the flow rate of post-combustion constituents flowing through the injected air curtain. The air flow rate preferably is adjusted so as to drop continuously from its initial peak through at least the majority of the secondary air injection event so as to maintain an air flow rate that is generally proportional to the flow rate of combustion products through the combustion chamber. Air injection preferably continues for the entire exhaust stroke to assure that all combustion products are mixed with air as they flow through the combustion chamber.

Post-combustion reaction can be maximized by using both early cycle air injection and late cycle air injection in the same engine and selecting between the two injection techniques depending upon prevailing engine operating characteristics. Early cycle air injection is most effective at light-to-intermediate engine loads, and late cycle air injection is most effective at heavy loads. Typically, early cycle air injection will be used for the bottom 40% to 70% of the engines load range, and late cycle air injection will be employed for the upper 30% to 60% of the engine's load range.

3. Exemplary Engine Constructions and Air Injection Techniques

The invention is theoretically applicable to virtually any internal combustion engine design. It is particularly well-suited to reciprocating engines having a separate combustion chamber and cylinder bore because the interface between the combustion chamber and the cylinder bore provides a location via which an air curtain may be easily formed for mixing the combustion products with supplemental air. Several applicable reciprocating engines will now be described.

A. Side-Valve 4 Stroke Engine

The side-valve 4 stroke engine offers a unique opportunity to mix supplemental air with hot combustion products because the combustion chamber is above and to the side of the cylinder bore. By suitably redesigning the combustion chamber, the volume of the combustion chamber can be rearranged from the conventional design practice of having a portion of the volume over the cylinder and a portion over the valve region to one in which nearly the entire combustion chamber is located over the valve region. The combustion chamber therefore extends from the valve region and far enough beyond the edge of the cylinder bore to create an intake/exhaust opening that allows gases to flow between the cylinder bore and the combustion chamber. The area adjacent the intake/exhaust opening contains the air curtain into which supplemental air is injected during either the late cycle or early cycle secondary air injection event.

Figure 3:
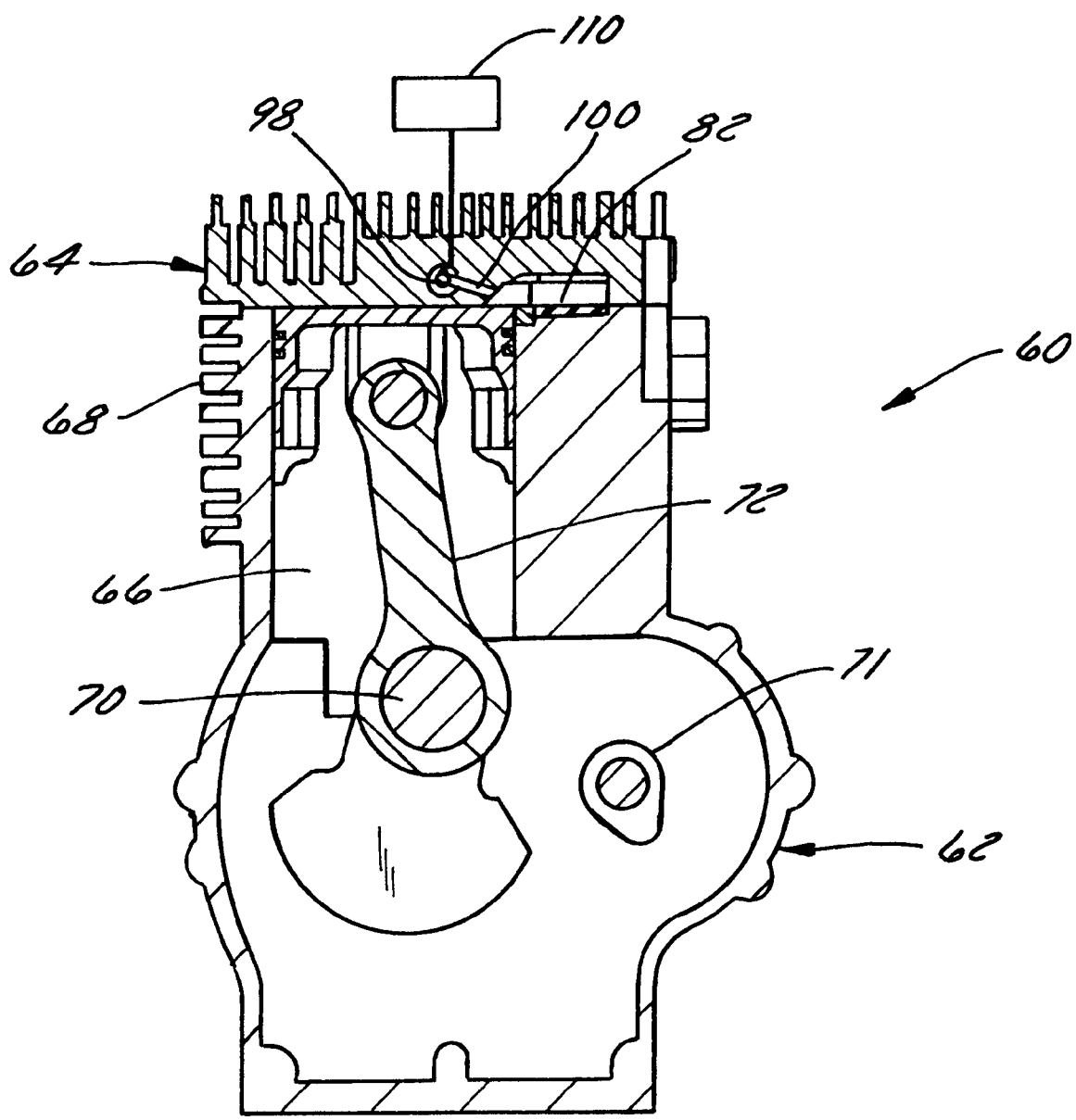
FIG. 3 is a partially schematic, side elevation view of a side inlet, 4 stroke engine incorporating a supplemental air injection system constructed in accordance with the present invention.
Figure 4:
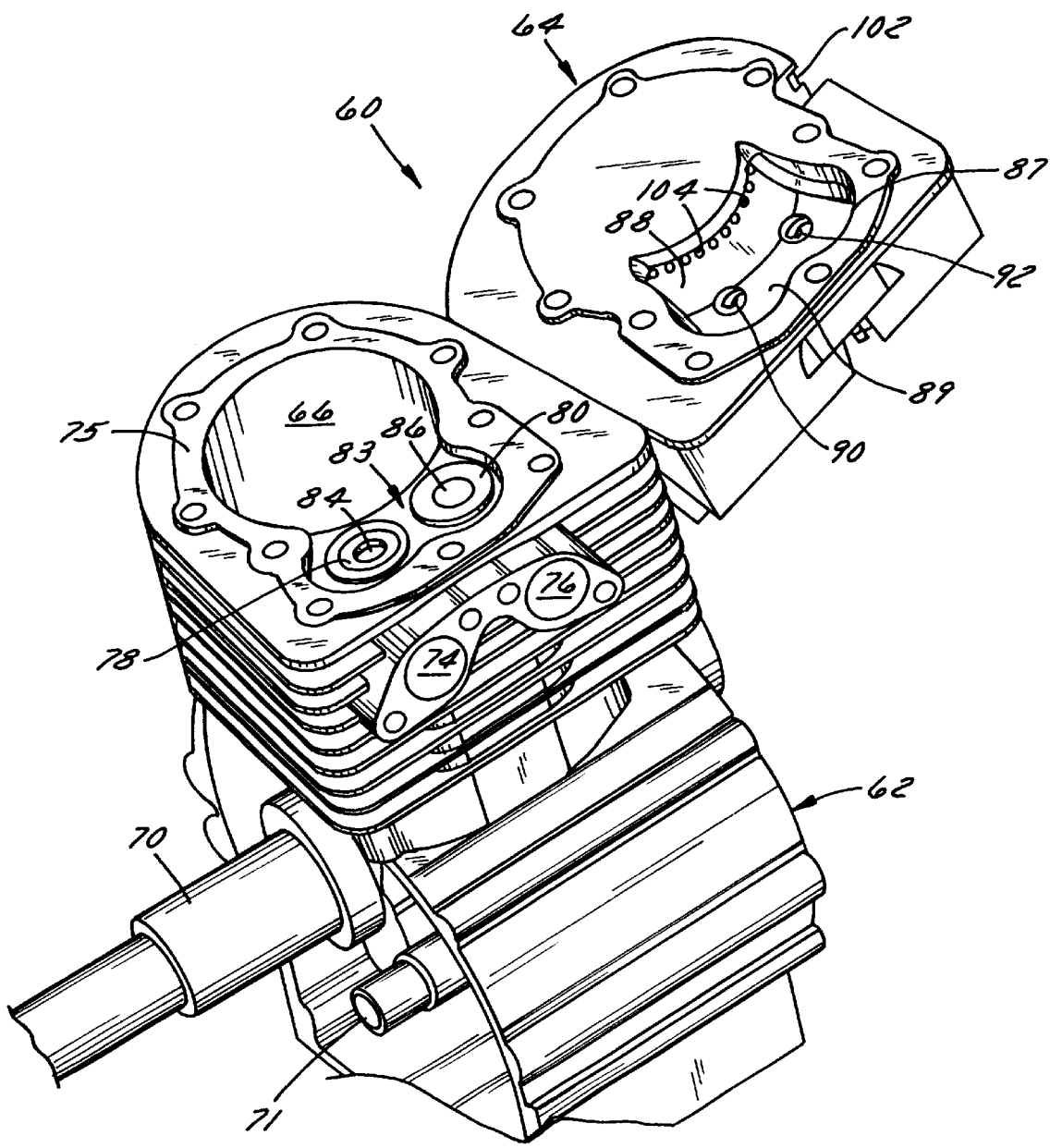
FIG. 4 is a partially-exploded perspective view of the engine of FIG. 3.
Figure 5:
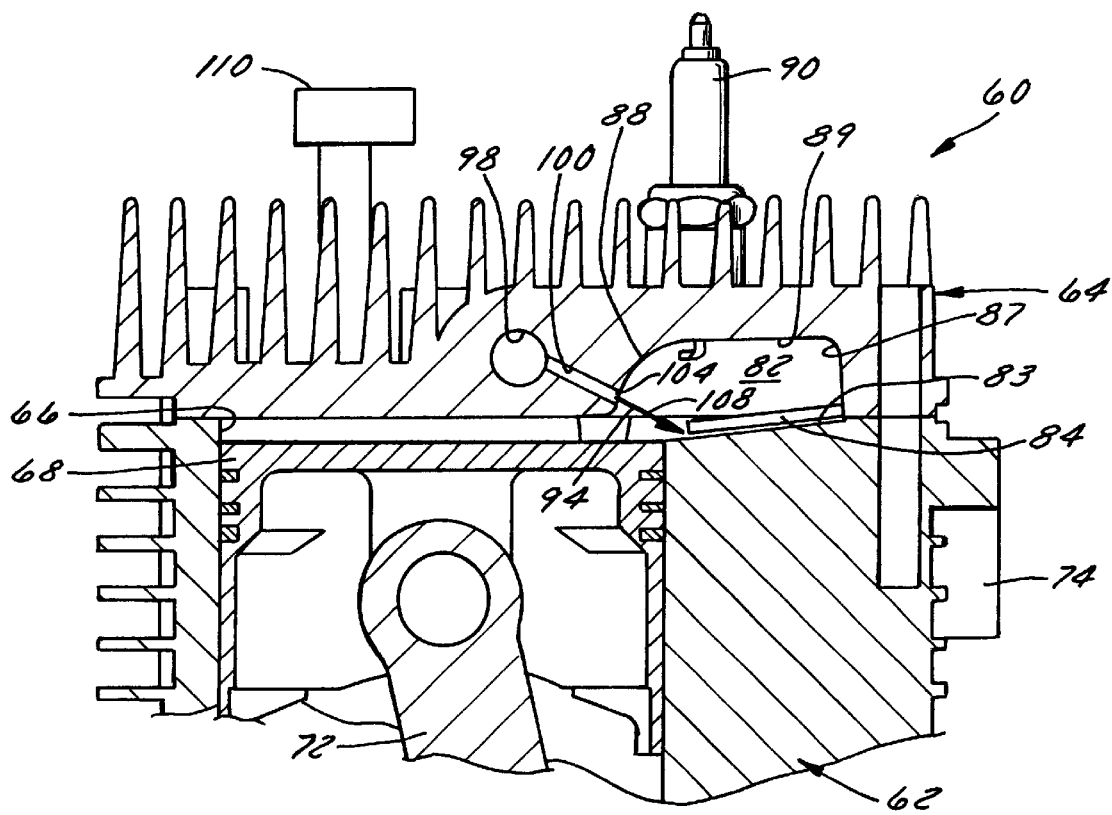
FIG. 5 is sectional side elevation view of an upper portion of the engine of FIGS. 3 and 4.

Specifically, and referring to FIGS. 3–5, one such engine is illustrated at 60. The engine 60 is relatively small (on the order of ½ to 25 horsepower) 4 stroke utility engine suitable for use, e.g., on a lawnmower or a garden tiller. The engine includes a crankcase 62 capped with a cylinder head 64. A cylinder is formed within the crankcase 62 to define a bore 66 that slidably receives a piston 68 in a conventional manner. A crankshaft 70 is mounted in the lower portion of the crankcase 62 beneath the bore 66 and is coupled to the piston 68 by a connecting rod 72. The cylinder head 64 is mounted above the bore 66 and sealed to the crankcase 62 by a gasket 75 (FIG. 4). Intake and exhaust passages 74 and 76 (FIGS. 6–12) are formed in the crankcase 62 beside the bore 66. The passages 74 and 76 terminate in respective intake and exhaust ports 78 and 80 opening into a combustion chamber 82. The ports 78 and 80 are selectively opened and closed by intake and exhaust valves 84 and 86 mounted in the crankcase 62 adjacent the bore 66 and powered via a camshaft 71 (FIG. 3) or the like in a conventional manner.

Still referring to FIGS. 3–5, the combustion chamber 82 is formed in the cylinder head 64 directly over the valves 84 and 86. It has a floor 83 formed by the upper surface of a ceiling 89 of the crankcase 62, an outboard wall 87 positioned outwardly of the valves 84 and 86, and an inboard wall 88 disposed inwardly of the valves 84 and 86 and a ceiling 89 positioned over the floor 83. The inboard wall 88 extends downwardly and outwardly from the ceiling 89 to the bottom of the cylinder head 64. It is also arcuate, having a radius of curvature generally matching that of the bore 66. A pair of sparkplugs 90 and 92 are mounted in the ceiling 89 and extend into the upper portion of the combustion chamber 82 to serve as an ignition source for the engine 60. Finally, an intake/exhaust opening 94 opens into the bore 66 at the bottom, innermost portion of the combustion chamber 82 to permit gases to flow freely between the bore 66 and the combustion chamber 82.

Still referring to FIGS. 3–5, an air injection system in the cylinder head 64 is configured to inject supplemental air into the combustion chamber 82 during a secondary air injection event initiated after initiation of the primary combustion event. The air injection system includes an air supply manifold 98 and a plurality of air supply passages 100. The air supply manifold 98 extends generally laterally and horizontally into the cylinder head 64 from an inlet opening 102 on the outboard side of the cylinder head 64. The air supply passages 100 are inclined downwardly and outwardly from the air supply manifold 98 to a row of air injection orifices 104 formed in the inboard wall 88 of the combustion chamber 82. The orifices 104 open into the combustion chamber 82 so as to form an "air curtain" upon the injection of air into the combustion chamber 82. The air curtain can be defined as the area encompassing lines 108 (FIG. 5) extending perpendicularly from the orifices 104 to the floor 83 of the combustion chamber 82. The air curtain has a mean length corresponding to the average length of the lines 108 and a width equal to the width of the row of orifices 104. The length and width of the ideal air curtain is configured to result in complete penetration of injected air through the gases flowing through the intake/exhaust opening 94 without noticeably impeding gas flow through the opening 94. In the illustrated example of a side-valve, 4 stroke engine, the air curtain has a width of about 0.7 to 1.2 of the diameter of the bore 66. Its area is from about 1.3 to about 2.1 of the flow area through the intake port 78. An air curtain having a larger area without being sufficiently narrow to achieve good jet penetration would obtain less than ideal mixing of the air and the gases. An air curtain having a significantly smaller flow area, i.e., one approaching the flow area through the intake port 78, could suffer throttling losses of the gases flowing through the air curtain, degrading engine performance. In the illustrated embodiment, the air curtain is formed by projections 108 from ten orifices 104 evenly spaced along the inclined arcuate inboard wall 88.

Referring particularly to FIGS. 3 and 5, the inlet 102 of the air injection system is connected to an air source schematically illustrated at 110 A source of compressed air usually would be required, particularly if the engine 60 were configured for early cycle injection instead of or in addition to late cycle injection, because the injection system must overcome peak or near peak cylinder pressures to inject air into the combustion chamber. The compressed air source 110 could comprise a simple compressor coupled to the crankshaft 70 or, if the engine 60 is used to power an air compressor, the source could be the air compressor itself. The compressor need only be powerful enough to generate the peak pressure required for late cycle injection, typically about 7 to 12 bar depending, e.g., on engine design, the application, and the peak load condition of the engine 60.

Operation of the engine 60 will now be described with reference to FIGS. 6–12.

Figure 6:
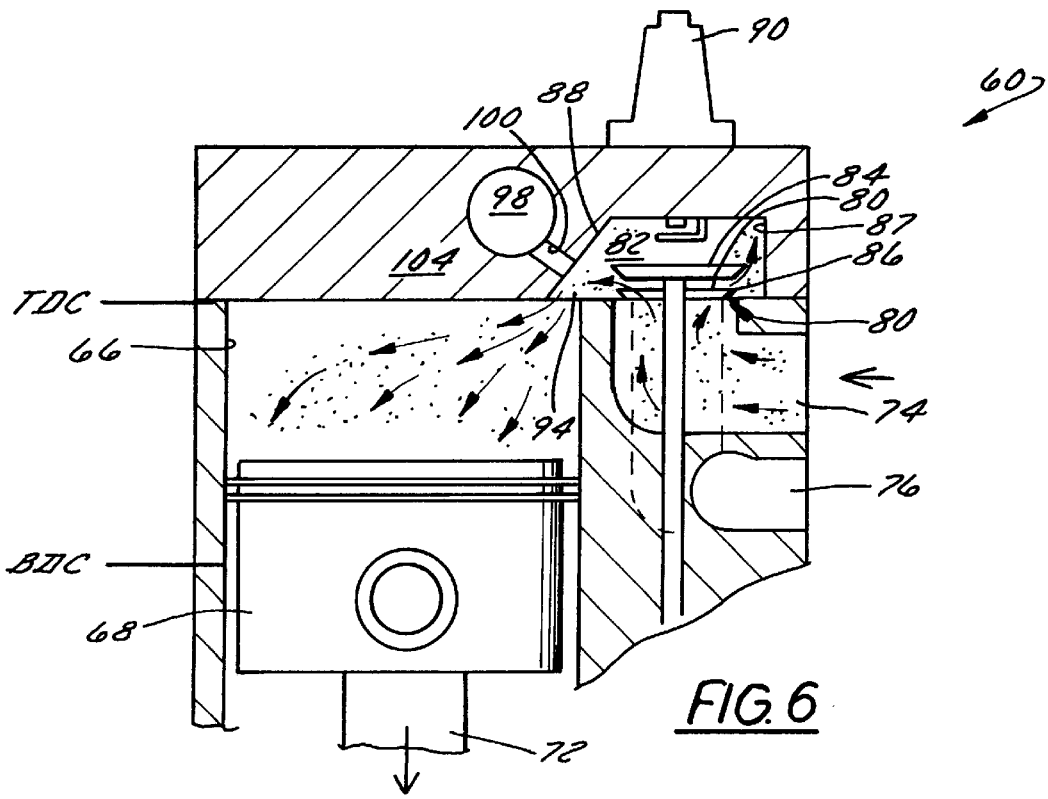
FIG. 6 somewhat schematically illustrates the engine of FIGS. 3–5, illustrating an intake stroke of the engine.

Referring to FIG. 6, the intake stroke proceeds in the normal manner, with an air/fuel charge flowing from a carburetor (not shown), through the intake passage 74, the intake valve 84, and into the combustion chamber 82 at a rich ER of, e.g., 1.2. The air/fuel charge then propagates into the cylinder bore 66 as the piston 68 slides downwardly in the bore 66 as the intake stroke continues. Alternatively, air could be inducted during the intake stroke in the absence of a carburetors, and fuel could be injected separately, either during the intake stroke or the subsequent compression stroke, using a suitable fuel injector.

Figure 7:
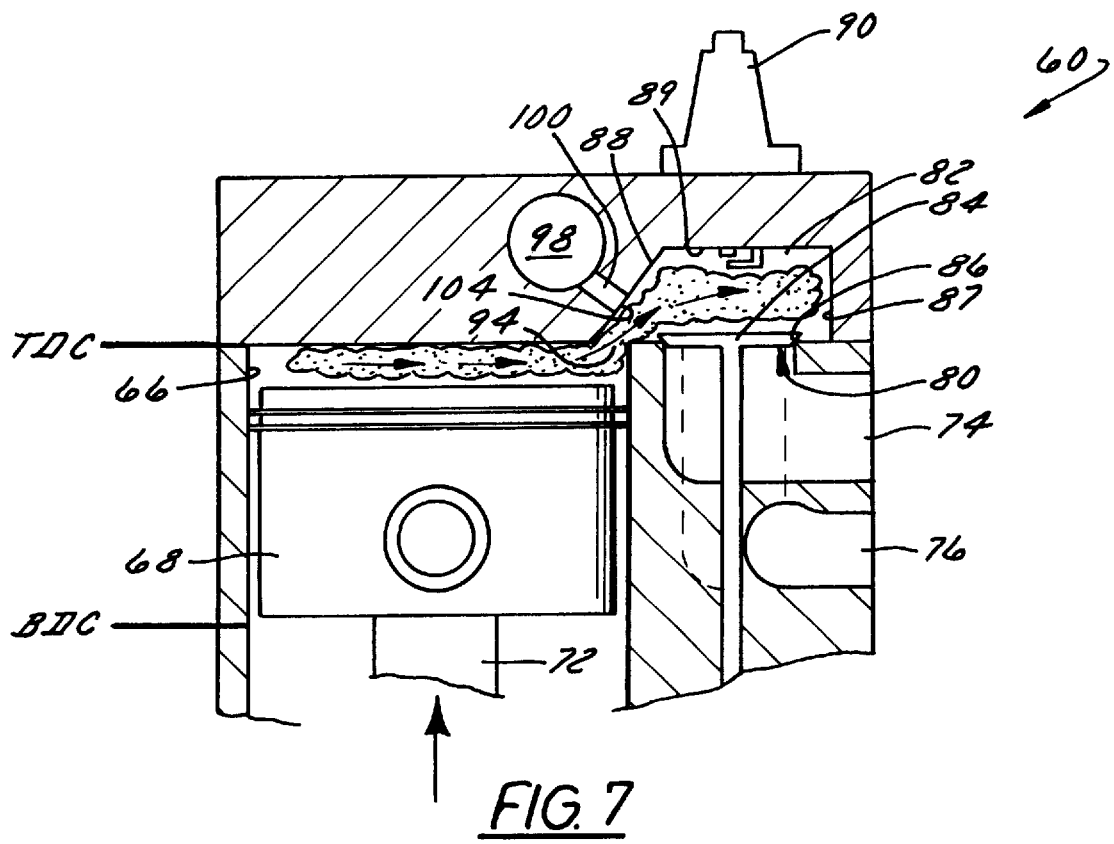
FIG. 7 corresponds to FIG. 6 and illustrates a compression stroke of the engine.
Figure 8:
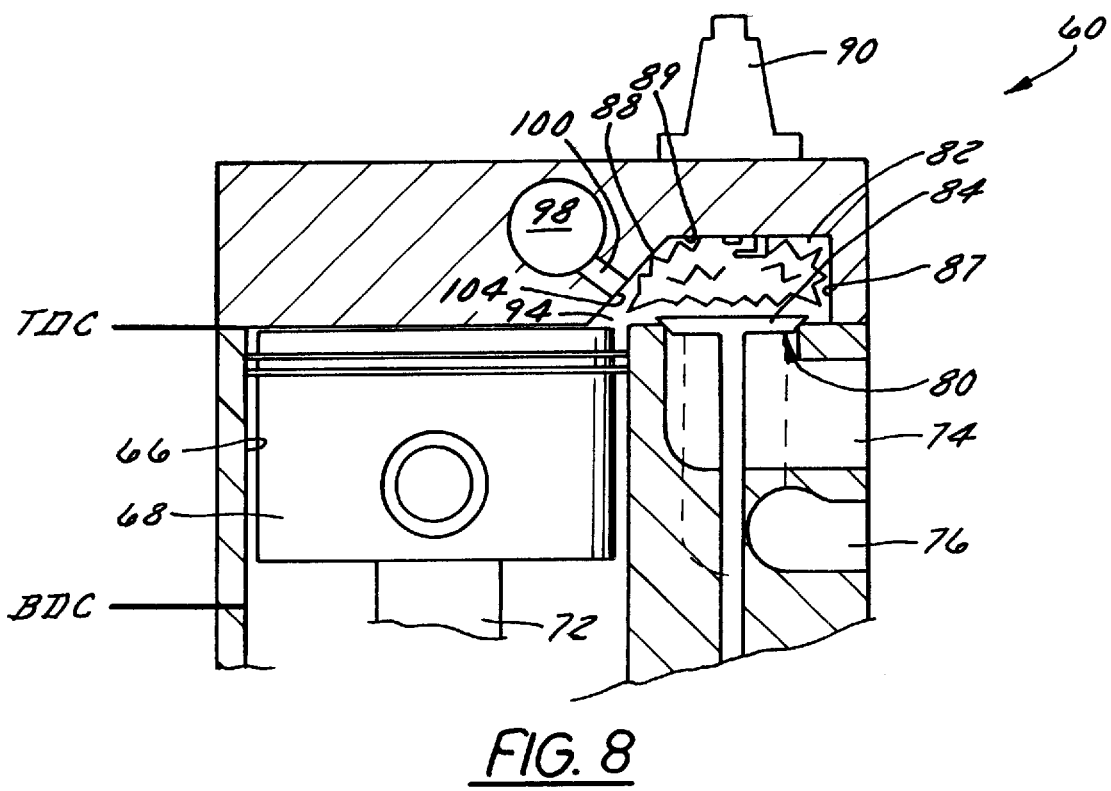
FIG. 8 corresponds to FIG. 6 and illustrates ignition of an air-fuel charge in the engine's combustion chamber.

The intake valve 84 then closes, and the piston 68 then moves upwardly through a compression stroke to the TDC position, thereby compressing the air/fuel mixture and forcing it into the combustion chamber 82 through the intake/exhaust opening 94 as seen in FIG. 7. The spark plugs 90 and 92 are then energized to ignite the air/fuel charge as seen in FIG. 8, and the combustion products flow into the cylinder bore 66 to drive the piston 68 downwardly to effect an expansion stroke of the engine 60. As discussed above, the intake, compression, and ignition events preferably are controlled to initiate and complete the combustion process as quickly as reasonably possible (preferably within 20° to 30° CA) to provide sufficient time for the supplemental air to be added to and effectively mixed with fuel-rich products of combustion. As discussed above, rapid combustion or "fast burn" can be facilitated by using multiple spark plugs as illustrated and/or by carefully designing the combustion chamber shape to maximize access of the air/fuel mixture to the energy supplied by the spark plug(s) or other ignition sources.

Figure 9:
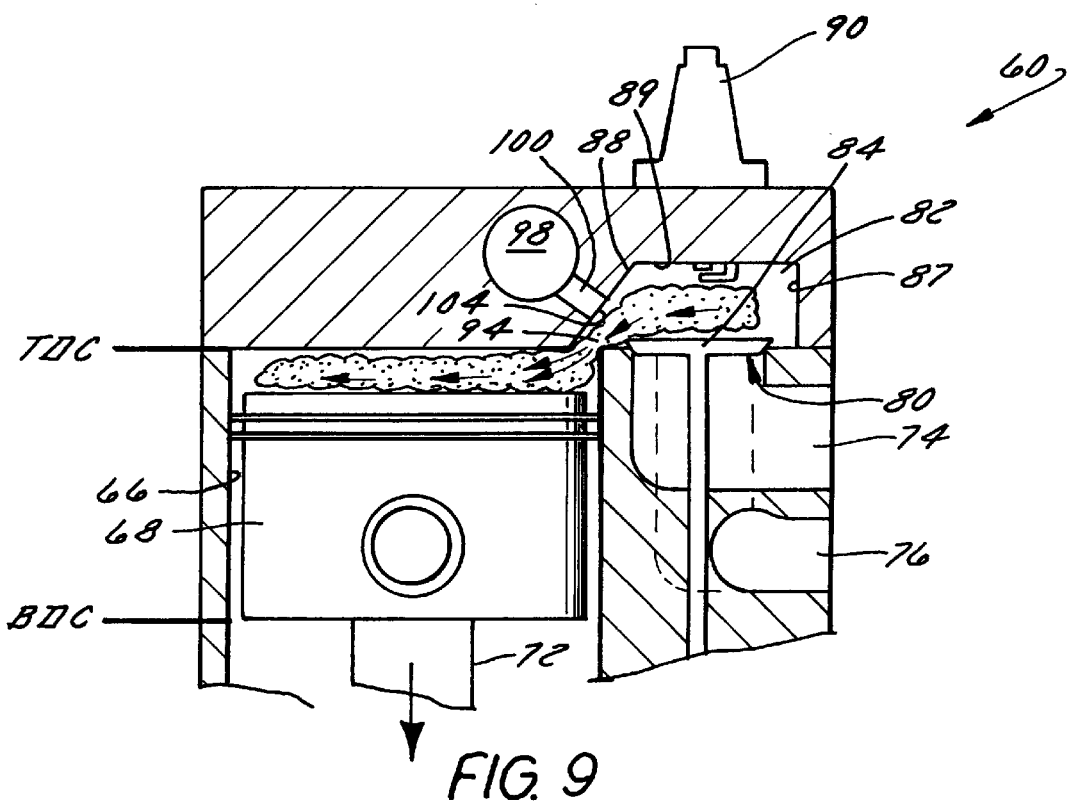
FIG. 9 corresponds to FIG. 6 but illustrates an early phase of an "early cycle" secondary air injection event occurring during an expansion stoke of the engine.
Figure 10:
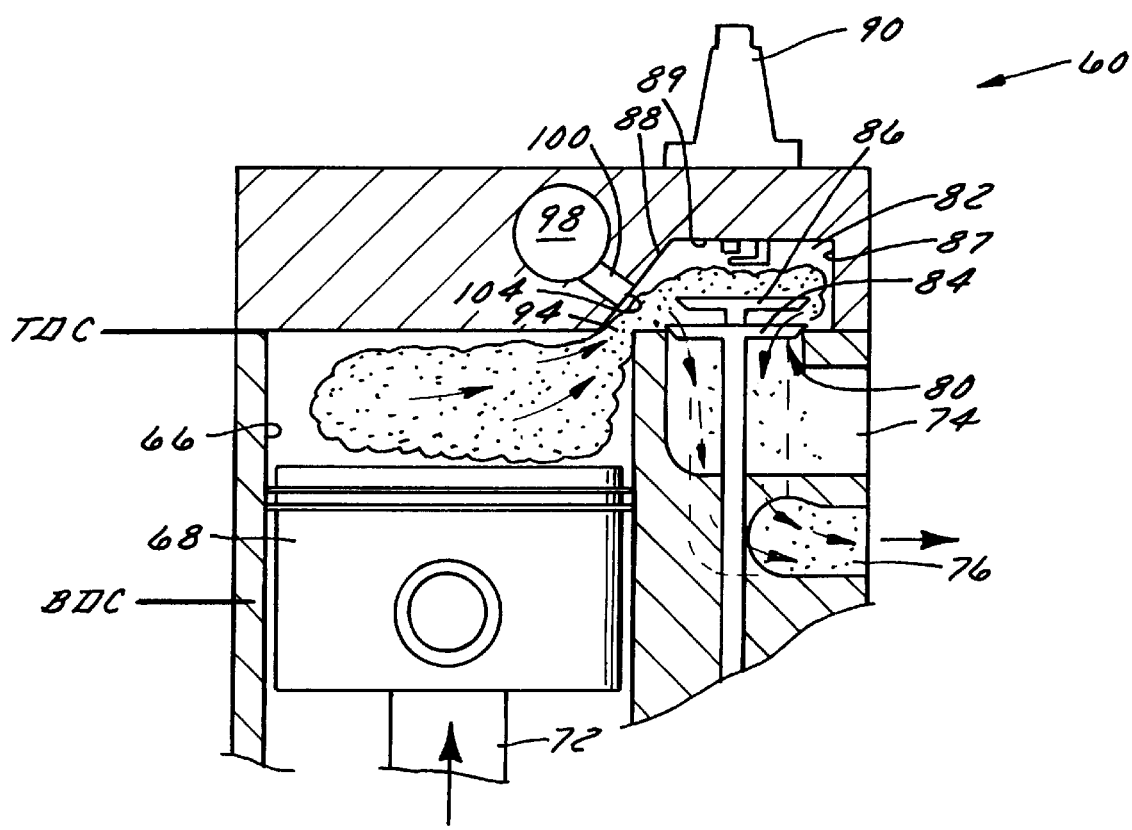
FIG. 10 corresponds to FIG. 9 but illustrates an exhaust stroke occurring after the early cycle secondary air injection event.
Figure 11:
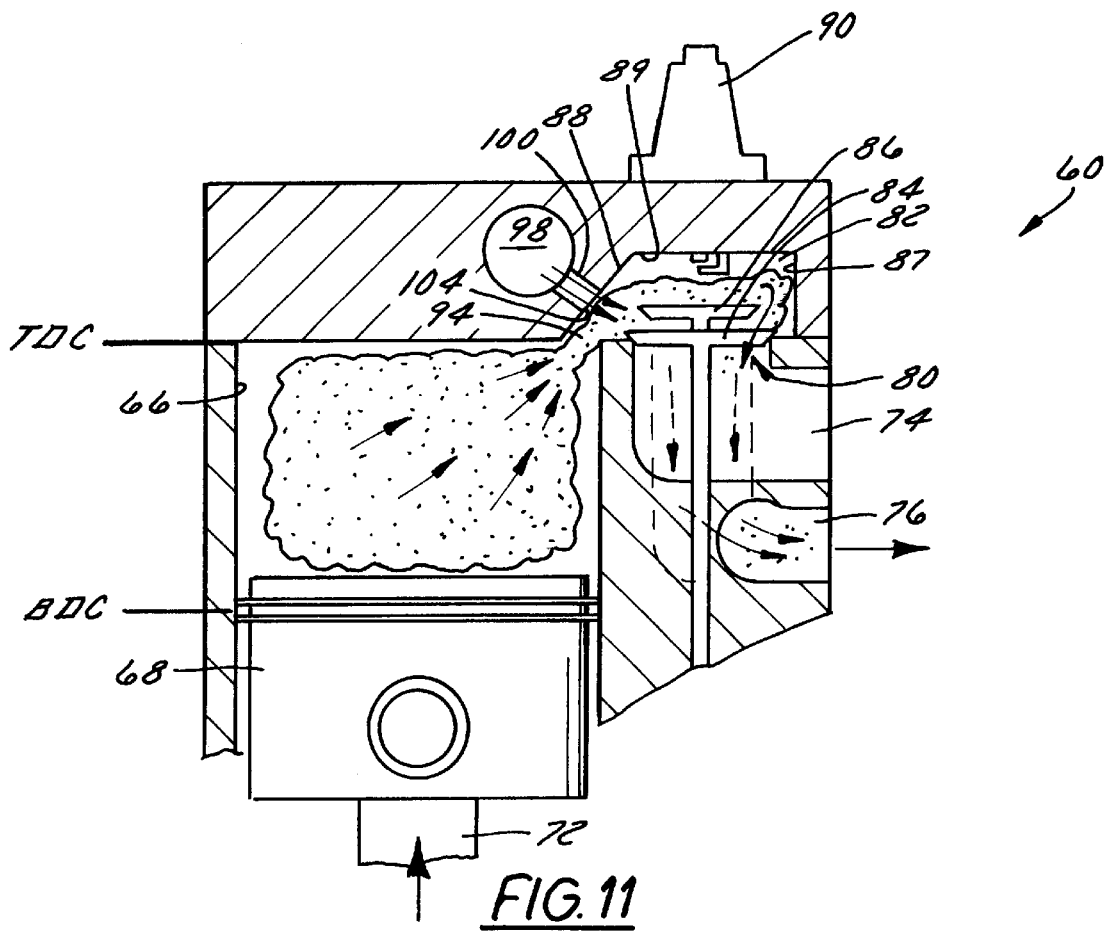
FIG. 11 corresponds to FIG. 6 but illustrates an early phase of a "late cycle" secondary air injection event occurring during an exhaust stoke of the engine.

During an early cycle secondary air injection event, supplemental air is injected through the orifices 104 and into the air curtain during a secondary air injection event commencing after ignition of the primary combustion event, where it penetrates the stream of hot combustion products flowing into the bore 66 from the combustion chamber 82 as illustrated in FIG. 9 to oxidize the residual reactable combustion product components. The secondary air injection event preferably begins immediately following the combustion event (ideally at TDC), while the bulk gas temperature is still quite high and, more importantly, before any combustion products flow out of the combustion chamber 82, thereby insuring high reactivity of the oxygen in the air and the residual reactable combustion product components. It continues through as much of the expansion stroke as is necessary to supply the optimum amount of oxygen required to oxidize the residual reactable combustion product components and to assure that all combustion products flowing through the air curtain mix with air. The relatively clean, i.e., more completely reacted combusted products, remaining after the resulting secondary reaction event are then exhausted from the exhaust port 80 during the subsequent exhaust stroke as seen in FIG. 10.

Figure 12:
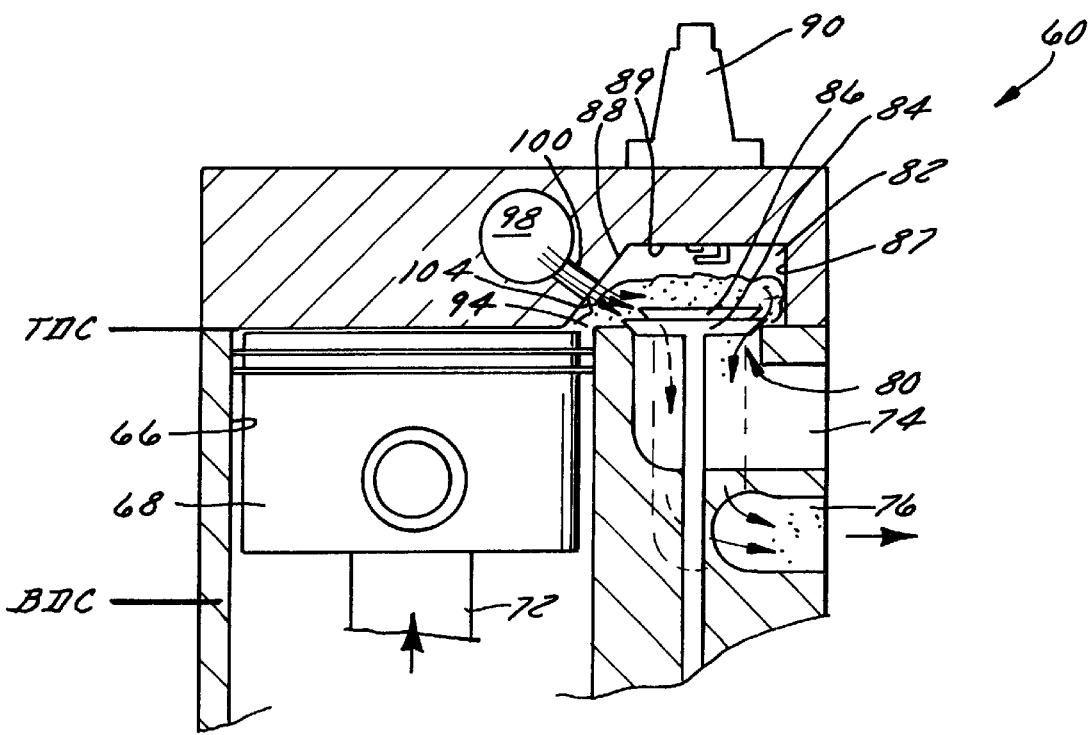
FIG. 12 corresponds to FIG. 6 but illustrates a late phase of a late cycle secondary air injection event.

During a late cycle secondary air injection event, an air/fuel charge is drawn into the engine 60, compressed, and ignited as discussed above and then flows into the bore 66 from the combustion chamber 82 to effect an expansion stroke of the engine without mixing with supplemental air. Then, referring to FIG. 11, pressurized supplemental air is injected into the air curtain during a secondary air injection event commencing at the beginning of the exhaust stroke. The injected air penetrates and mixes with the hot combustion products flowing into the combustion chamber 82 from the bore 66 to oxidize the residual reactable components of those products. Injection continues throughout the exhaust stroke so that all combustion products have the opportunity to mix and react with the incoming air prior to being exhausted from the exhaust port 80 as illustrated in FIG. 12. As discussed above, and as in an early cycle secondary air injection event, the air flow rate preferably is controlled to supply the optimal quantity of air to oxidize all unburnt and partially burnt fuel forming the residual reactable combustion product components.

Preliminary tests on an engine configured and operated as described above are very encouraging. At a steady-state operational point, a baseline or unmodified side-valve 10 hp 4 stroke engine exhibited a 4.5% carbon monoxide(CO) emission level. CO emissions were reduced to 0.05% when the same engine was converted to inject secondary air as described above. Hydrocarbon (HC) emissions were reduced from 2200 ppm to 55 ppm. In addition, the unmodified baseline engine must be operated outdoors and leaves the operator's eyes red and watering and clothing articles smelling quite foul from the engine's exhaust. The converted engine exhibits none of these traits and but, instead, can be operated comfortably in a more confined environment.

B. Other Four Stroke Engines

Figure 14:
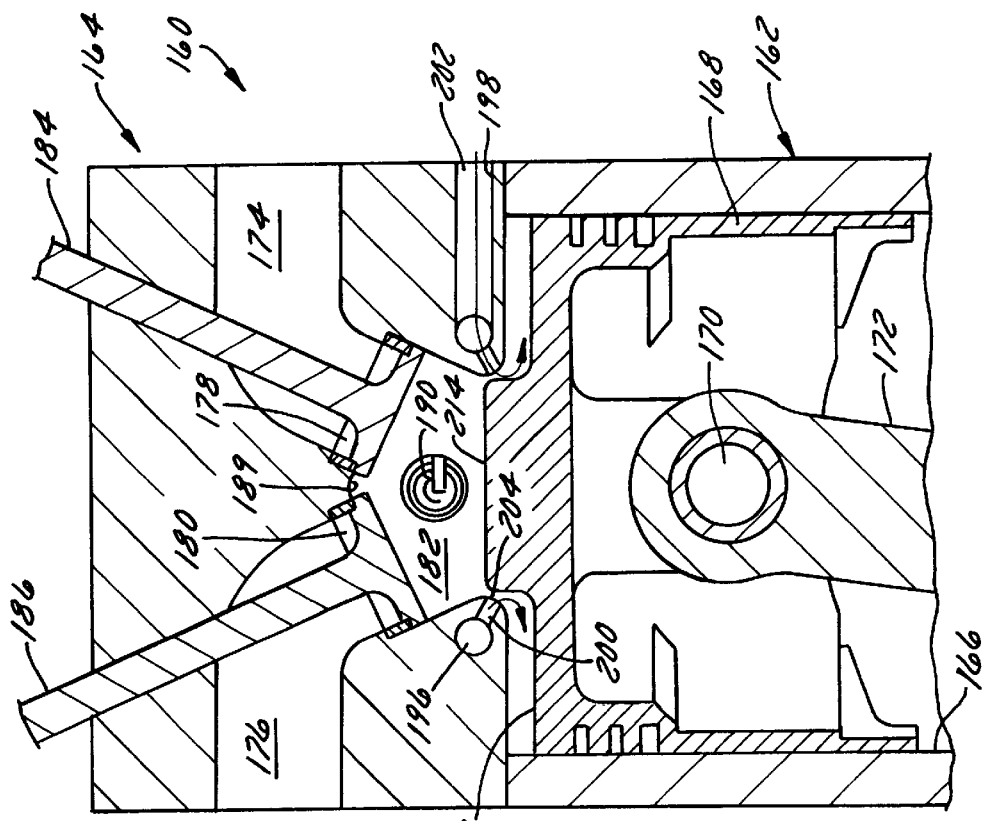
FIG. 14 corresponds to FIG. 13 and illustrates a secondary air injection event occurring during an expansion stoke of the engine.
Figure 13:
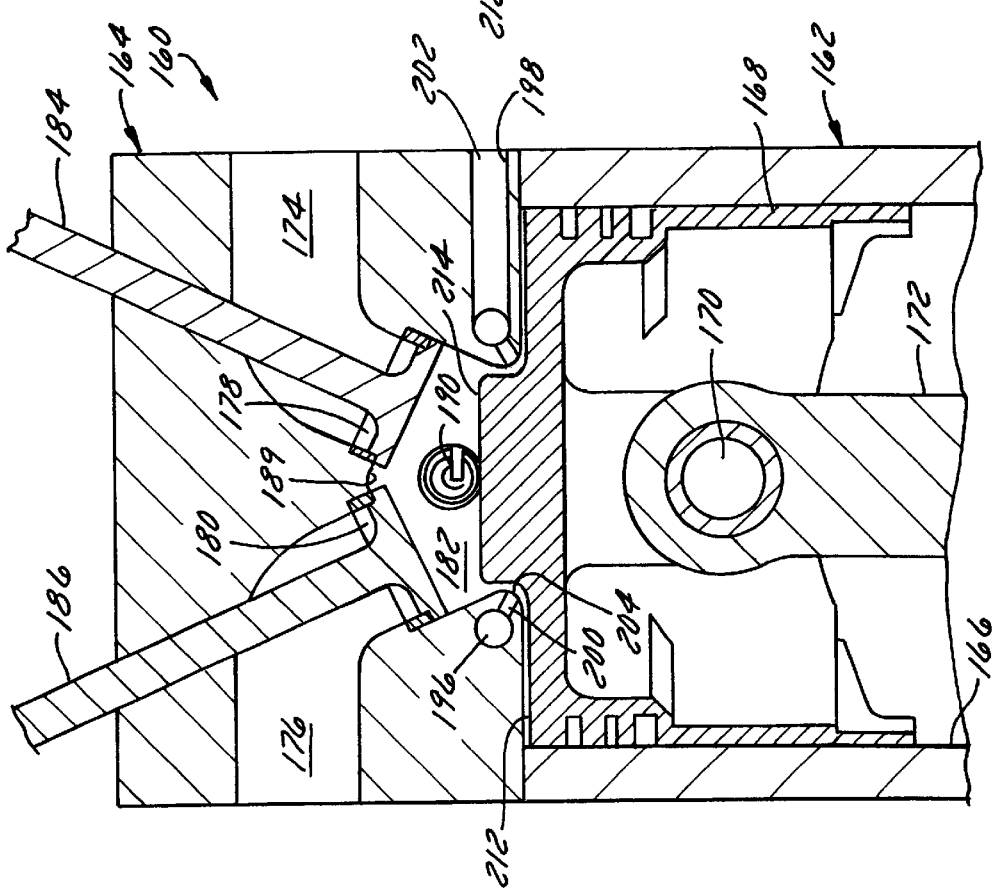
FIG. 13 is a partially schematic side elevation view of a canted overhead valve, 4 stroke engine incorporating a supplemental air injection system constructed in accordance with the present invention and illustrating a piston of the engine in a top dead center position thereof.
Figure 15:
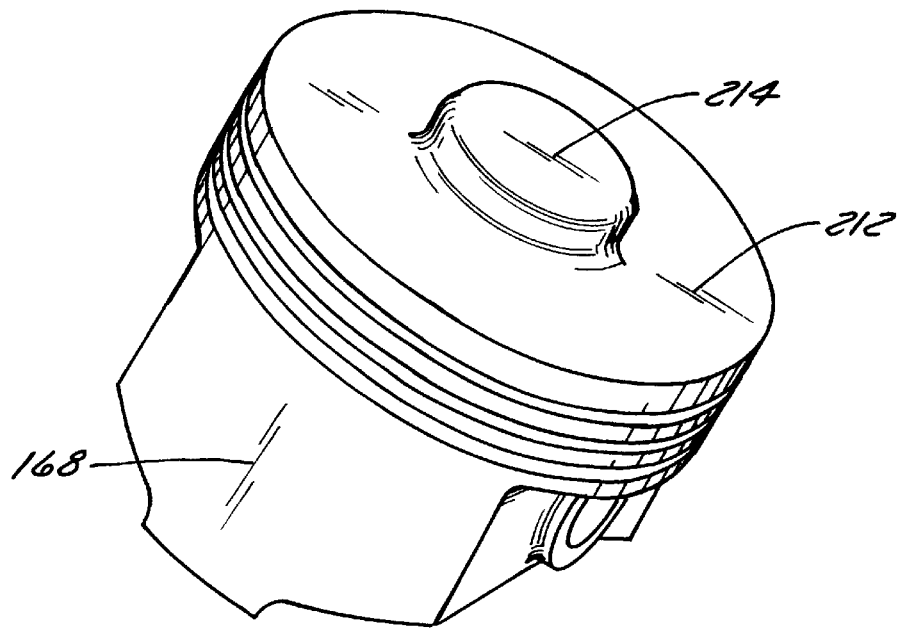
FIG. 15 is a perspective view of the piston of the engine of FIGS. 13 and 14.

The invention is also applicable to overhead valve 4 stroke engines, such as the engine 160 illustrated FIGS. 13–15. The engine includes a crankcase 162 capped with a cylinder head 164. A cylinder bore 166, a piston 168, a crankshaft 170, and a connecting rod 172 are all located in the crankcase 162 and operate similarly to the corresponding components of the engine 60 described above. A combustion chamber 182 is formed in cylinder head 164 directly over the cylinder bore 166. The combustion chamber 182 is configured to be "fast burn" by virtue of a toroidal shape and a high compression ratio. Intake and exhaust passages 174 and 176 in the cylinder head 164 terminate at intake and exhaust ports 178 and 180 opening into the ceiling 189 of the combustion chamber 182. The ports 178 and 180 are selectively opened and closed by intake and exhaust valves 184 and 186 extending into the cylinder head 164 from above. The valves 184 and 186 of this embodiment are canted relative to the axis of the bore 66 to allow machining of valve seat features and valve installation through the cylindrical hole in the bottom portion of the combustion chamber 182. A spark plug 190 extends into the combustion chamber beneath the intake and exhaust ports 178 and 180.

A supplemental air injection system is provided in the cylinder head beneath the intake and exhaust passages 174 and 176. The air injection system of this embodiment includes a horizontal air inlet passage 198, a circular air supply manifold 196, and a plurality of air supply passages 200 that are spaced around the periphery of the combustion chamber 182 and that extend generally radially from the manifold 196 to injection orifices 204 opening into the combustion chamber 182.

Because the combustion chamber 182 is situated directly above the piston 168 and cylinder bore 166, a different air curtain system can utilized to achieve the effects described in section A above more efficiently. In both embodiments, the air curtain is preferably configured to maximize air jet penetration into the combustion product stream. This requires a relatively short air curtain length for a particular width. However, a short length reduces the available flow area for the flow of gases from the combustion chamber to the cylinder bore, potentially leading to throttling losses. In the side-valve embodiment, the air curtain length is constant, resulting in at least limited throttling losses throughout the engine's operating cycle. However, in the overhead valve embodiment, air penetration can be maximized at the most critical points in the air injection cycle while minimizing average throttling losses by incorporating a stepped piston air curtain design into the system. Specifically, the piston 168 is stepped, having a circular protrusion 214 extending upwardly from the top 212 of the piston 168 as best seen in FIG. 15. The opening in the bottom of the combustion chamber 182 has a complementary circular shape. The protrusion 214 on the piston 168 extends into that opening when the piston 168 is in its TDC position of FIG. 13 to form an annular gap between the protrusion 214 on the piston 168 and the perimeter of the combustion chamber 182. This gap is functionally analogous to the intake/exhaust opening of the previous embodiment and forms the air curtain of the air injection system. Referring to FIG. 14, the air curtain is very short during the early phase of the expansion stroke, when the bulk of the supplemental air is injected, leading to good jet penetration-and thorough mixing. However, this small length is not detrimental to the performance of the engine at this time because the gases flowing through the gap are dense due to the high pressure in the combustion chamber 182 and due to the fact that the piston velocity is low when the piston is at or near the end of its stroke. Hence, the rate of change in the cylinder volume is low at this time. Moreover, in other portions of the cycle, such as in most of the compression and expansion strokes, the engine 160 sees no throttling losses because the protrusion 214 on the piston 168 does not extend into the combustion chamber 182 during these portions, permitting unrestricted gas flow into and out of the combustion chamber.

Figure 16:
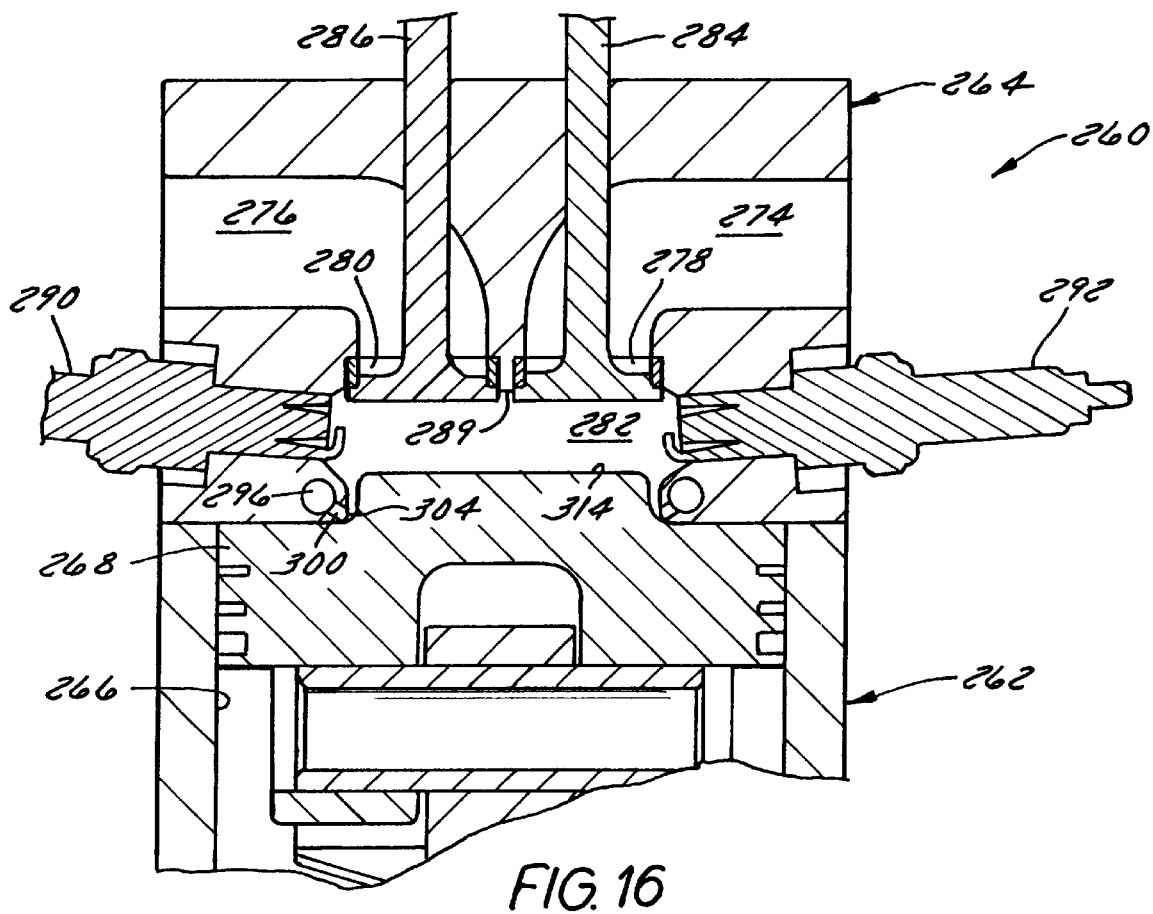
FIG. 16 is a partially schematic side elevation view of an overhead valve, 4 stroke engine incorporating a supplemental air injection system constructed in accordance with the present invention and illustrating a piston of the engine in a top dead center position thereof.
Figure 17:
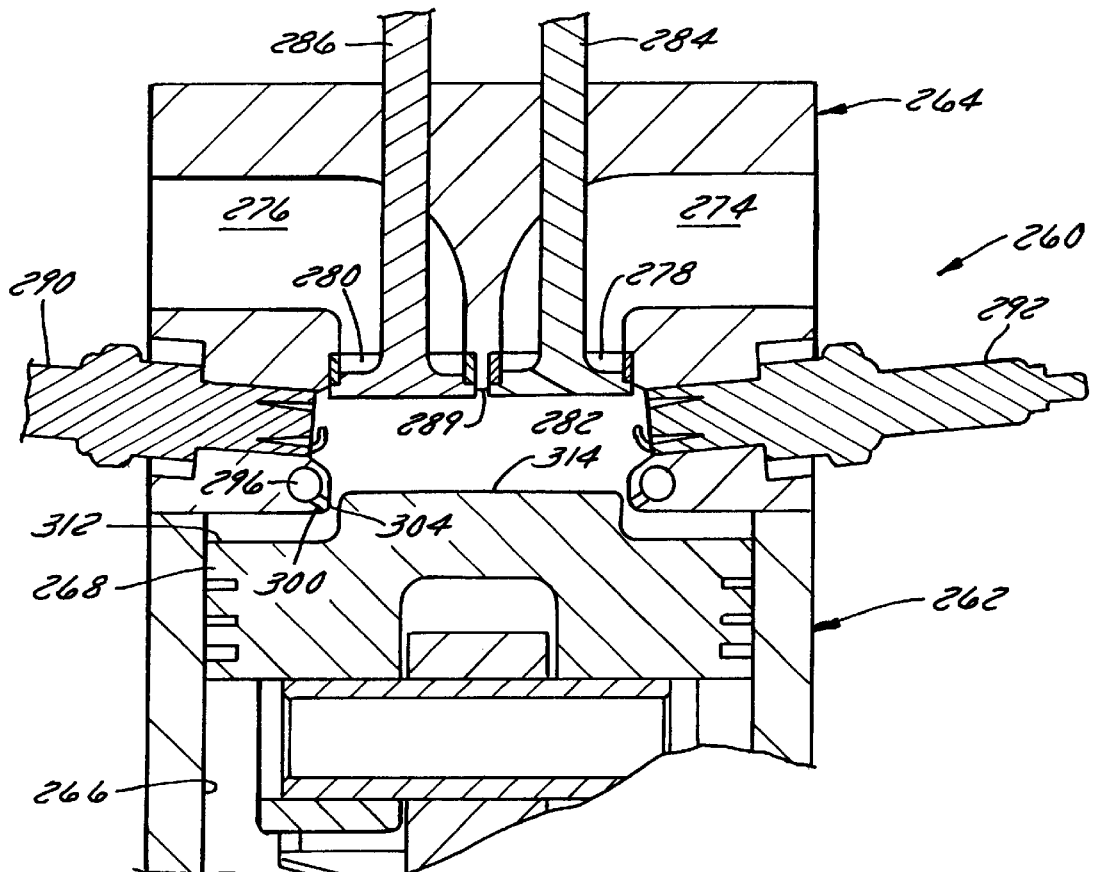
FIG. 17 corresponds to FIG. 16 and illustrates a secondary air injection event occurring during an expansion stoke of the engine.

Alternatively, the intake/exhaust valves could be configured to extend vertically rather than at an angle, thereby permitting the valves to be situated side-by-side and parallel with the cylinder bore 266 as seen in FIGS. 16 and 17. The engine 260 of this embodiment is otherwise quite similar to the canted valve overhead engine 160 of the previous embodiment, having a crankcase 262 capped with a cylinder head 264. A cylinder bore 266, a piston 268, a crankshaft (not shown), and a connecting rod (also not shown), are all located in the crankcase 262. A combustion chamber 282 is formed in the cylinder head 264 directly over the cylinder bore 266. Intake and exhaust passages 274 and 276 in the cylinder head 264 terminate at intake and exhaust ports 278 and 280 opening into the ceiling 289 of the combustion chamber 282. The ports 278 and 280 are selectively opened and closed by intake and exhaust valves 284 and 286 extending into the cylinder head 264 from above. A supplemental air injection system in the cylinder head 264 includes a horizontal air inlet passage (not shown), an air supply manifold 296 extending around the periphery of the combustion chamber 282, and a plurality of air supply passages 300. As in the previous embodiment, the passages 300 are spaced around the periphery of the combustion chamber 282, extend generally radially from the manifold 296, and terminate in injection orifices 304 opening into the combustion chamber 282. Also as in the previous embodiment, the air curtain is formed between the orifices 304 and a protrusion 314 on top 312 of the piston 268 when the piston 268 is near or in its TDC position.

Figure 18:
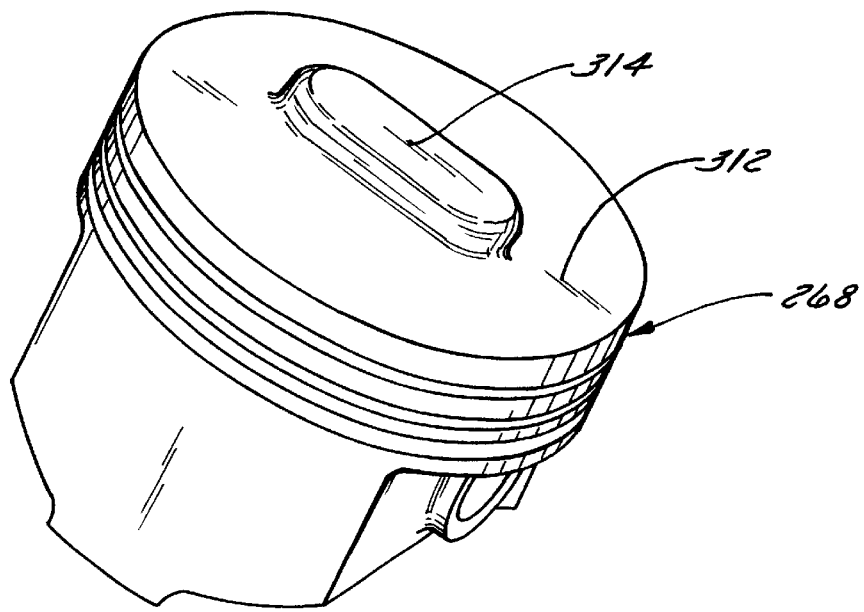
FIG. 18 is a perspective view of the piston of the engine of FIGS. 16 and 17.

In order to permit the side-by-side positioning of the valves 284 and 286, the combustion chamber 282 and piston head projection 314 are both oblong rather than circular (the oblong shape of the protrusion 314 is best seen in FIG. 18). The resultant engine 260 is relatively inexpensive to manufacture because the valves and seat features can be machined at the same time that the fastening holes are machined in the cylinder head 264, without having to rotate the head to machine the valve features. This design also leaves adequate room beneath the valves 284 and 286 to utilize a pair of spark plugs 290 and 292 of this embodiment to enhance the engine's fast burn capability. The spark plugs 290 and 292 extend into the combustion chamber 282 beneath the valves 284 and 286 from opposite sides of the combustion chamber 282.

C. 2 Stroke Engine

Figure 19:
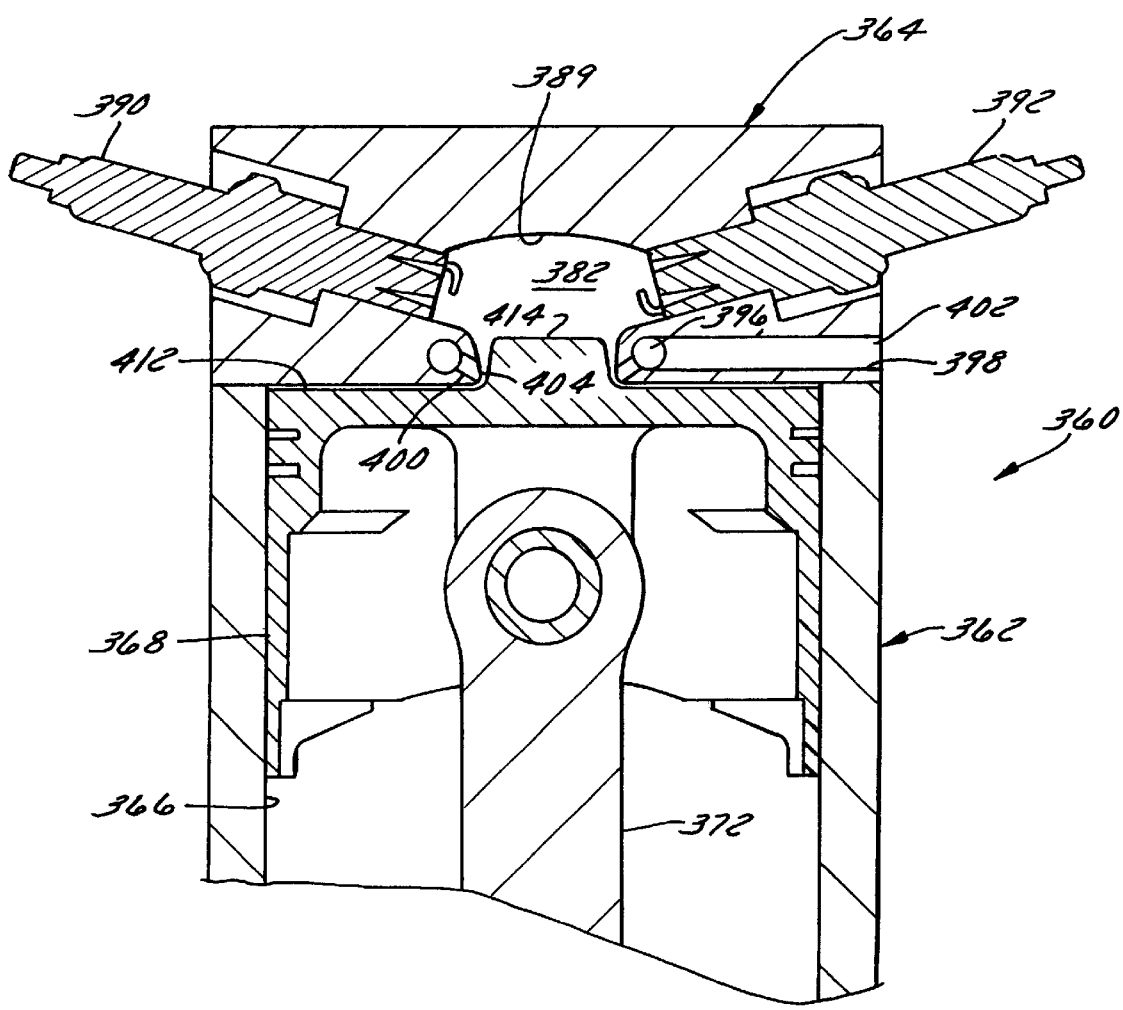
FIG. 19 is a partially schematic side elevation view of a 2 stroke engine incorporating a supplemental air supply system constructed in accordance with the present invention and illustrating a piston of the engine in a top dead center position thereof.
Figure 20:
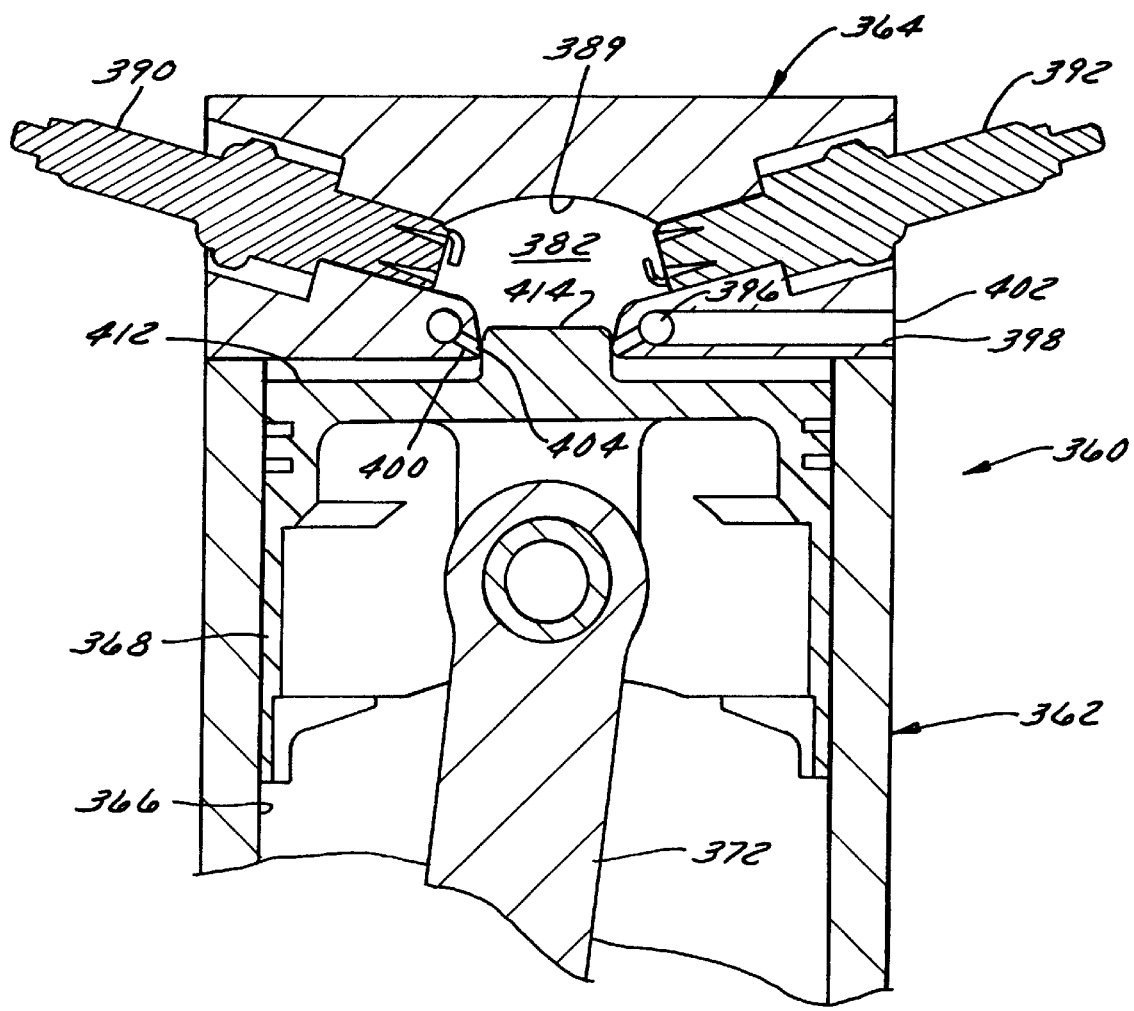
FIG. 20 corresponds to FIG. 19 and illustrates a secondary air injection event occurring during an expansion stoke of the engine.

Referring now to FIGS. 19 and 20, the stepped piston design of FIGS. 13–15 also is usable in a 2 stroke engine 360. This engine 360 differs conceptually from the engine 160 of FIGS. 13–15 only in that, as is typical with 2 stroke engines, the intake and exhaust ports (not shown) are formed in the cylinder bore 366 at a location beneath the combustion chamber 382. This leaves more room in the combustion chamber 382 to receive at least one additional spark plug in addition to the illustrated spark plugs 390 and 392 to maximize the ability to effect a "fast burn" combustion event. The construction of this embodiment is otherwise essentially identical to the construction of the embodiment of FIGS. 13–15. The engine 360 therefore includes a crankcase 362 capped with a cylinder head 364 and housing a bore 366, a piston 368, a connecting rod 372, and a crankshaft (not shown). A toroidal combustion chamber 382, having a ceiling 389, is located directly above the bore 366, and the piston 368 has a circular protrusion 414 extending from the upper surface 412 thereof. The protrusion 414 extends into a circular opening in the bottom of the combustion chamber 382 when the piston 368 approaches its top dead center position to form an air curtain therebetween. The engine 360 also includes an air injection system including an inlet passage 398 having an inlet opening 402, a circular air supply manifold 396, and generally radial supply passages 400 terminating in orifices 404.

Post-combustion reaction of this embodiment takes place in much the same manner as early cycle post-combustion reaction in the overhead valve embodiment of FIGS. 13–15. That is, comparing FIG. 20 to FIG. 14, initial downward movement of the piston 368 or 168 of each embodiment during the expansion stroke thereof creates an air curtain between the protrusion 414 or 214 on the piston and the periphery of the combustion chamber 382 or 182. Supplemental air is injected into the air curtain at that time from the air inlet passage 398 or 198, the air supply manifold 396 or 196, the supply passages 400 or 200, and the orifices 404 or 104 so as to mix with combustion products flowing therethrough and into the cylinder bore 366 or 166. Also as in the previous embodiments, the air and combustion products mix with one another to effect a post-combustion reaction of the hot, high pressure residual reactable combustion product components with the oxygen in the air, thereby reducing HC and CO emissions when the remaining clean combustion products are exhausted from the engine 366 during the latter stages of the expansion/exhaust stroke.

D. 6 Stroke Engine

The secondary reaction event could also be performed during post-combustion intake and compression-reaction strokes of a six stroke engine. The 6 stroke embodiment may be the least practical of the embodiments described herein because it has relatively high parasitic losses. However, it is conceptually the simplest because the secondary reaction event takes place during a separate HCCI event occurring after and separately from the existing main combustion cycle. Virtually any conventional 4 stroke, spark-ignited or other otto-cycle engine or its derivative could be used for this embodiment, with the only modifications being modifications to the cams and/or other mechanisms required to alter ignition timing and/or timing of intake and exhaust valve opening to add the additional strokes.

In this embodiment, the first several cycles (intake, compression, combustion, and expansion) remain unchanged from the 4 stroke process as illustrated by the lines 542, 544, 546, 548, and 550 on the timing chart of FIG. 21. Near the end of the expansion event, the cylinder contains hot combustion products high in HC and CO concentrations due to the over-fueling of the engine by the fuel-rich calibration of the engine's carburetor. In a normal 4 stroke cycle, the exhaust valve opens near the end of the expansion event. (As explained above, the cylinder will be over-fueled by 20% if the carburetor is set for an ER of 1.2, 30% if the carburetor is set for an ER of 1.3, etc). However, the 6 stroke cycle retains the exhaust products within the cylinder and proceeds with an additional recompression stroke 552 and re-expansion stroke 554 after the traditional expansion stroke 550 and prior to the traditional exhaust stroke 542. In a typical system, the contents of the cylinder have a pressure of about 3–6 bar and a temperature of approximately 800–1200° at the end of the expansion even 550. Supplemental air is strategically injected into the combustion chamber during a secondary air injection event 556 taking place at the end of the expansion stroke The air reacts with the residual reactable combustion product components during the recompression event by HCCI or an event closely approximating HCCI. The resulting secondary reaction event 558 drives the piston downwardly to effect the re-expansion stroke 554, and the "clean" combustion products are exhausted from the engine in the next exhaust stroke occurring after the re-expansion stroke 554. The six strokes of the cycle (intake, compression, expansion and air injection, recompression, re-expansion, and exhaust) are then repeated on a continuous basis.

The secondary air injection event preferably is timed to reduce parasitic losses that could occur if the "dirty" exhaust gases were reacted with air at a time when the resulting pressure rise due to reaction counters power production and efficiency. Preferably, the secondary air injection event is timed such that the injected air and unburnt fuel are energetically mixed only at or near the end of the recompression event so that the remaining energy of the residual reactable combustion product components can be released during the re-expansion event, permitting that energy to be recovered in the form of additional shaft power. Losses can also be alleviated by utilizing a supplemental air injection system of the type generally described above and by designing the injection orifices such that they are located within the valve pocket region of the cylinder head and are of a large enough flow area and a proper orientation to quiescently admit the air into this region with minimal velocity and turbulence, minimizing the mixing of air and unburnt fuel prior to the recompression event. While there is some unwanted reaction at the interface between the air and the combustion products, most of the mixing and resultant reaction occur as the result of "squish" when the piston arrives at TDC and rapidly squishes the contents of the cylinder bore into the same valve pocket volume previously containing only air. This turbulent mixing causes a well-timed reaction of the residual reactable combustion product components with the injected air, resulting in augmented shaft power output due to the energy being released early in the re-expansion event.

Many changes and modifications could be made to the invention in addition to those discussed above. For instance, although the embodiments described above focus on an engine having a separate "fast burn" combustion chamber and a separate air injection system, it is conceivable that, even in a 2 stroke or 4 stroke engine, the post-combustion reaction could take place in the main cylinder bore via the carefully timed admission of additional air through either a separate air injection system or, conceivably, through the existing air intake port(s). The invention is also applicable to otto cycle engines other than utility engines and to rotary engines, wobble plate engines, and other engines other than reciprocating piston engines. Other changes will become apparent from the appended claims.

I claim:

1. A method of reducing emissions in an internal combustion engine comprising:
   (A) admitting fuel and primary combustion air into a combustion chamber of the engine, said primary combustion air being admitted into the combustion chamber through an intake port of said engine, said combustion chamber being in communication with a cylinder bore; then (B) after the end of the admission step, igniting said fuel to initiate a primary combustion event and to form combustion products; then (C) admitting additional air into said engine through a secondary air injection orifice and reacting said additional air with residual reactable components of said combustion products to effect post-combustion oxidation of said residual reactable combustion components to create relatively clean combustion products; and then (D) exhausting said relatively clean combustion products from said engine.

2. The method as claim 1, wherein the igniting step comprises spark-igniting a fuel/air charge in the combustion chamber, the additional air admission step comprises injecting the additional air into the combustion chamber, and the post-combustion oxidizing step comprises mixing the additional air with the combustion products and oxidizing the residual reactable combustion products components.

3. The method as recited in claim 1, wherein said engine is a 4 stroke engine, and the post-combustion oxidizing step comprises reacting said residual reactable combustion product components with air during at least one of an expansion stroke of said engine and an exhaust stroke of said engine.

4. The method as recited in claim 3, wherein the post-combustion oxidizing step comprises reacting said residual reactable combustion product components with air during at least part said expansion stroke of said engine.

5. The method as recited in claim 3, which the post-combustion oxidizing step comprises reacting said residual reactable combustion product components with air during at least part of said exhaust stroke of said engine.

6. The method as recited in claim 3, further comprising timing the post-combustion oxidizing event such that post-combustion oxidization occurs during at least part of the expansion stroke under a first engine operating condition and during the exhaust stroke during at least part of a second engine operating condition.

7. The method as recited in claim 6, wherein the first and second engine operating conditions are first and second load conditions, said second load condition being a relatively heavy load condition when compared to said first load condition.

8. The method as recited in claim 1, wherein said engine is a 6 stroke engine, and wherein the post-combustion oxidization event takes place during at least one of a recompression stroke and a re-expansion stroke occurring sequentially after said expansion stroke of said engine and before an exhaust stroke of said engine.

9. The method as recited in claim 8, wherein the step of admitting additional air comprises injecting air into said combustion chamber near the end of said expansion stroke of said engine.

10. The method as recited in claim 1, wherein said engine is a 2 stroke engine, and the post-combustion oxidization event takes place during an expansion/exhaust stroke of said engine.

11. A method of reducing emissions in an internal combustion engine comprising:

(A) admitting fuel and primary combustion air into a combustion chamber of the engine, said combustion chamber being in communication with a cylinder bore; then (B) after the end of the admission step, igniting said fuel to initiate a primary combustion event and to form combustion products; then (C) admitting additional air into said engine and reacting said additional air with residual reactable components of said combustion products to effect post-combustion oxidation of said residual reactable combustion components to create relatively clean combustion products; and then (D) exhausting said relatively clean combustion products from said engine, wherein said engine is a 4 stroke engine, and the post-combustion oxidizing step comprises reacting said residual reactable combustion product components with air during at least one of an expansion stroke of said engine and an exhaust stroke of said engine, wherein the step of admitting additional air comprises injecting air into an air curtain through which said combustion products pass.

12. The method as recited in claim 11, further comprising timing the injection of air into said air curtain such that said combustion products pass through said air curtain during at least part of said expansion stroke of said engine.

13. The method as recited in claim 11, further comprising timing the injection of air into said air curtain such that said combustion products pass through said air curtain during at least part of said exhaust stroke of said engine.

14. A method of reducing emissions in an internal combustion engine comprising:

(A) admitting an air/fuel charge into a combustion chamber of an engine cylinder through an air intake port, said combustion chamber communicating with a bore in said cylinder via an intake/exhaust opening formed therebetween;

(B) spark-igniting said charge to initiate an expansion stroke of said engine and to form combustion products; then (C) injecting additional air into said combustion chamber through a secondary air injection orifice and directing said combustion products through said additional air so as to mix said combustion products with said additional air and to effect a post-combustion oxidization of residual reactable components of said combustion products and to form relatively clean combustion products; and then (D) exhausting said relatively clean combustion products through an exhaust valve of said engine.

15. The method as recited in claim 14, further comprising timing the air injection event such that combustion products flowing into said combustion chamber from said bore during an exhaust stroke of said engine are directed through and react with the injected air.

16. The method as recited in claim 14, further comprising timing the air injection event such that combustion products flowing from said bore into said combustion chamber during at least part of said expansion stroke of said engine are directed through said injected air.

17. A method of reducing emissions in an internal combustion engine comprising:

(A) admitting an air/fuel charge into a combustion chamber of an engine cylinder, said combustion chamber communicating with a bore in said cylinder via an intake/exhaust opening formed therebetween;

(B) spark-igniting said charge to initiate an expansion stroke of said engine and to form combustion products; then (C) injecting additional air into said combustion chamber and directing said combustion products through said additional air so as to mix said combustion products with said additional air and to effect a post-combustion oxidization of residual reactable components of said combustion products and to form relatively clean combustion products; and then (D) exhausting said relatively clean combustion products through an exhaust valve of said engine wherein the injecting step comprises injecting air into an air-curtain formed in said combustion chamber adjacent said intake/exhaust opening.

18. An internal combustion engine comprising:
(A) a casing having a main chamber formed therein;
(B) a power producing member being movably mounted in said main chamber, a combustion chamber being formed in said engine, being in fluid communication with said main chamber, and being separated from the atmosphere by an exhaust port; and
(C) an air admission system configured to admit primary combustion air into said combustion chamber in at least a first air supply event occurring prior to a primary combustion event of said engine and to admit secondary reaction air into said combustion chamber in a second, distinct air supply event occurring after initiation of the primary combustion event and prior to exhaust of combustion products from said exhaust port, said air admission system including an intake port through which said primary combustion air is admitted and an air injection system including a secondary air injection orifice through which said secondary air is admitted.

19. The internal combustion engine as recited in claim 18, wherein said engine is a reciprocating engine, wherein said main chamber is a bore in fluid communication with said combustion chamber, and wherein said power producing member comprises a piston slidably disposed in said bore.

20. The internal combustion engine as recited in claim 18, wherein said combustion chamber is separated from said main chamber of said casing by an intake/exhaust opening.

21. The engine as recited in claim 20, wherein said engine is a side-valve, 4 cycle, utility engine.

22. The engine as recited in claim 20, further comprising a source of compressed air that supplies air to said air injection system.

23. The engine as recited in claim 20, wherein said engine is a reciprocating engine, wherein said main chamber is a bore in fluid communication with said combustion chamber, wherein said power producing member comprises a piston slidably disposed in said bore, and wherein said combustion chamber is located directly above said bore and said piston is a stepped piston having a protrusion that extends into said combustion chamber at a top dead center position of said piston.

24. The engine as recited in claim 23, wherein said combustion chamber has intake and exhaust parts formed therein.

25. The engine as recited in claim 23, wherein said engine is a 2 cycle engine having said intake port and an exhaust port located remote from said combustion chamber.

26. An internal combustion engine comprising:
(A) a casing having a main chamber formed therein;
(B) a power producing member being movably mounted in said main chamber, a combustion chamber being formed in said engine, being in fluid communication with said main chamber, and being separated from the atmosphere by an exhaust port; and
(C) an air admission system configured to admit primary combustion air into said combustion chamber in at least a first air supply event occurring prior to a primary combustion event of said engine and to admit secondary reaction air into said combustion chamber in a second, distinct air supply event occurring after initiation of the primary combustion event and prior to exhaust of combustion products from said exhaust port, wherein said combustion chamber is separated from said main chamber of said casing by an intake/exhaust opening, wherein said air injection system comprises a row of air supply passages opening into a plurality of air injection orifices formed in said combustion chamber in the vicinity of said intake/exhaust opening.

27. The engine as recited in claim 26, wherein an air curtain is formed beneath said orifices and has a width essentially equal to the length of said row.

28. The engine as recited in claim 27, wherein an aspect ratio of said air curtain width to a diameter of said bore is between 0.5 and 1.5.

29. The engine as recited in claim 27, wherein the air curtain has an area defined by the width of said row times the width of said combustion chamber along lines projecting perpendicularly from said orifices, and wherein an aspect ratio of said air curtain area to a flow area of said intake valve is between 1.0 and 2.5.

* * * * *